US012751435B2

(12) United States Patent
Justmann et al.

(10) Patent No.: US 12,751,435 B2
(45) Date of Patent: Oct. 6, 2026

(54) FISHING LURES

(71) Applicants: William David Justmann, Sheboygan, WI (US); David Andrae Justmann, Somerset, WI (US)

(72) Inventors: William David Justmann, Sheboygan, WI (US); David Andrae Justmann, Somerset, WI (US)

( * ) Notice: Subject to any disclaimer, the term of this patent is extended or adjusted under 35 U.S.C. 154(b) by 18 days.

(21) Appl. No.: 18/544,687

(22) Filed: Dec. 19, 2023

(65) Prior Publication Data

US 2024/0196874 A1 Jun. 20, 2024

Related U.S. Application Data

(60) Provisional application No. 63/476,176, filed on Dec. 20, 2022.

(51) Int. Cl.
*A01K 85/00* (2006.01)

(52) U.S. Cl.
CPC ................................ *A01K 85/1803* (2022.02)

(58) Field of Classification Search
CPC .. A01K 85/1803; A01K 85/029; A01K 85/16; A01K 85/18; A01K 85/1867; A01K 85/1841; A01K 85/1851
USPC ........... 43/42.47, 42.22, 42.48, 42.09, 42.21, 43/42.49, 42.23, 42.36
See application file for complete search history.

(56) References Cited

U.S. PATENT DOCUMENTS

| | | | | | |
|---|---|---|---|---|---|
| 923,670 | A * | 6/1909 | Lockhart | A01K 85/16 | 43/42.06 |
| 1,333,154 | A * | 3/1920 | Buddle | A01K 85/02 | 43/42.43 |
| 1,352,054 | A * | 9/1920 | Dills | A01K 85/16 | 43/42.23 |
| 1,672,498 | A * | 6/1928 | Otto | A01K 85/02 | 43/42.46 |
| 1,848,704 | A * | 3/1932 | Farley | A01K 85/16 | 43/42.34 |
| 1,890,266 | A * | 12/1932 | Schadkll | A01K 85/02 | 43/37 |
| 2,117,206 | A * | 5/1938 | Neff | A01K 85/012 | 43/42.34 |

(Continued)

OTHER PUBLICATIONS

Webpage https://www.supernaturalbigbaits.com/pages/about-us, Dec. 14, 2023.

(Continued)

*Primary Examiner* — Maria E Graber

(57) ABSTRACT

Embodiments relate to fishing lures with a lure body having a proximal end and a distal end extending longitudinally along a central axis, a proximal end region, and two substantially mirror image side surfaces. A lure lip is provided in the proximal end region of the lure body. The lure lip protrudes outwardly from the lure body along a plane at an angle to the central axis. One or a plurality of holes are provided through the lure lip being spaced along a centerline of the lure lip. The holes in the lure lip are sized to receive a substantially rigid connector inserted through a selected one of them. At least one hole through the lure lip is manufactured with a major axis or diameter greater than the diameter of a traditional clearance hole for a corresponding nominal diameter substantially rigid connector.

13 Claims, 13 Drawing Sheets

(56) References Cited

U.S. PATENT DOCUMENTS

| | | | | | |
|---|---|---|---|---|---|
| 2,298,811 | A * | 10/1942 | Sisco | A01K 85/16 | 43/42.3 |
| D161,820 | S * | 2/1951 | Brooks | 43/42.47 | |
| 2,577,402 | A * | 12/1951 | Carnes | A01K 85/16 | 43/42.36 |
| 2,674,059 | A * | 4/1954 | Boyd | A01K 85/16 | 43/42.09 |
| 2,878,611 | A * | 3/1959 | Netherton | A01K 85/16 | 43/42.31 |
| 3,248,820 | A * | 5/1966 | Lamar | A01K 85/00 | D22/127 |
| 3,462,871 | A * | 8/1969 | Mcvay | A01K 85/16 | 43/42.47 |
| 3,507,070 | A * | 4/1970 | Rossello | A01K 85/16 | 43/42.36 |
| 3,535,813 | A * | 10/1970 | Cordell, Jr. | A01K 85/16 | 43/42.39 |
| 3,950,882 | A * | 4/1976 | Monchil | A01K 85/16 | 43/42.42 |
| 4,134,224 | A * | 1/1979 | Clark | A01K 85/16 | 43/42.35 |
| 4,215,507 | A * | 8/1980 | Russell | A01K 85/16 | 43/42.22 |
| 4,245,421 | A * | 1/1981 | Phillips | A01K 85/16 | 43/42.47 |
| 4,438,583 | A * | 3/1984 | Sullivan | A01K 85/16 | 43/42.31 |
| 4,765,084 | A * | 8/1988 | Braden | A01K 85/16 | 43/34 |
| 4,777,761 | A * | 10/1988 | Renaud | A01K 85/16 | 43/42.47 |
| 4,870,776 | A | 10/1989 | Schock | | |
| 5,337,508 | A * | 8/1994 | Pfeiffer | A01K 85/16 | 43/42.22 |
| 5,857,283 | A | 1/1999 | Perrick | | |
| 6,101,758 | A * | 8/2000 | Finley | A01K 85/16 | 43/42.22 |
| 7,621,068 | B1 * | 11/2009 | Renosky | A01K 85/16 | 43/42.49 |
| 8,695,272 | B2 * | 4/2014 | Miller | A01K 95/00 | 43/43.1 |
| 10,477,845 | B1 * | 11/2019 | Davis | A01K 85/02 | |
| 2015/0150226 | A1 * | 6/2015 | McLeod | A01K 85/16 | 43/42.06 |
| 2018/0332837 | A1 * | 11/2018 | Morrow | A01K 85/12 | |
| 2019/0261614 | A1 * | 8/2019 | Olsen | A01K 91/04 | |
| 2021/0267181 | A1 | 9/2021 | Ostruszka et al. | | |
| 2022/0132820 | A1 * | 5/2022 | Willey | A01K 95/00 | 43/42.39 |
| 2022/0400660 | A1 * | 12/2022 | Teschendorf | A01K 85/01 | |
| 2023/0019774 | A1 | 1/2023 | Ostruszka et al. | | |

OTHER PUBLICATIONS

Webpage https://www.supernaturalbigbaits.com/pages/faqs, Dec. 14, 2023.

Webpage https://leelures.com/products/pelagic-10, Dec. 14, 2023.

* cited by examiner

FISHING LURES

PRIORITY

The present patent application claims priority to U.S. provisional patent application No. 63/476,176 titled "Fishing Lures" filed on Dec. 20, 2022, which is fully incorporated herein by reference.

TECHNICAL FIELD

Embodiments relate generally to fishing lures, and more particularly to fishing lures with a lure body having a proximal end and a distal end extending longitudinally along a central axis, and a lure lip in a proximal end region of the lure body, protruding outwardly from the lure body at an angle to the central axis.

BACKGROUND

A variety of fishing lures have a wandering action when trolled submerged from a boat. Those skilled in the art often use the terms "wandering" and "searching" synonymously when describing such fishing lure action.

Wandering fishing lures often wander erratically. For example, while trolling one behind a boat, a wandering fishing lure starts at an initial position behind the boat after a desired amount of fishing line connected to the fishing lure has been released from the reel. The fishing lure begins to wander to one side of the course centerline that is established by the boat's direction of travel. Later, the fishing lure begins wandering back toward the course centerline. It may continue its wander to the other side of the course centerline or it may wander only partway toward the course centerline and then wander back away from the course centerline again. Erratic wandering such as this or other random variations thereof can continue in various paths until the fishing lure is brought back into the boat.

Two such commercially available wandering fishing lures are HeadLock and MattLock lures manufactured by Supernatural Big Baits with an address of 755 Prior Ave N #201, St Paul, MN 55104. Supernatural Big Baits are well known among many anglers who pursue large muskellunge and are cited by many anglers as embodying state of the art wandering fishing lure technology. During studies of HeadLock and MattLock lures purchased, it was determined that their lips were made with approximately 3⁄16 inch diameter clearance holes, through which a 3⁄16 inch nominal diameter clevis pin is inserted. According to the American National Standards Institute (ANSI), the loosest standard running clearance fit class is ANSI B4.1 RC9. The RC9 diameter for a 3⁄16 inch shaft is a maximum of 0.1905 inches. For further reference, the loosest ANSI B4.1 fit class is locational clearance fit class LC11. The LC11 diameter for a 3⁄16 inch shaft is 0.1945 inches. It was found during development of fishing lures embodying subject matter disclosed herein that using a 13⁄64 (0.2031) inch diameter or greater diameter drill bit to create the clearance hole for a 3⁄16 clevis pin increased wandering action of a fishing lure. For the sake of clarity, the shank of a 13⁄64 inch diameter drill bit did not fit through any of the holes of any commercially available traditional wandering fishing lures examined.

The Supernatural Big Baits website provides teachings about the state of the art in their commercially available wandering fishing lures. The website states, in part: "Even though HeadLocks will run at 2.5 mph, they are really made for speed. Once you crank it up into the 4.5 mph to 6+ mph range, they violently come to life. At slower speeds they will have a tighter 'wiggle' with very little 'wander', but at higher speeds the 'wander' action is dominant." Another teaching on the Supernatural Big Baits website states, in part: "The lips on the 10" HeadLock, 12" HeadLock and MattLock come with 3 depth settings. The shallowest setting is closest to the lip's edge/furthest way from the body. This setting is not only the shallowest diving, but is also the most erratic of the three and produces the best 'searching' action that the Supernatural Big Baits are known for. As you move positions back towards the body the depth of the dive increases with the deepest setting being the one furthest from the edge of the lip/closest to the body. Keep in mind: the deeper the setting—the less erratic the action. The deepest setting produces more of a tight wiggle without the erratic wobble of the shallow setting."

Another commercially available wandering fishing lure is the Pelagic 10" available from Lee Lures through the website leelures.com. The Pelagic 10" is also well known among many anglers who pursue large muskellunge and is also cited by anglers as embodying state of the art wandering fishing lure technology. Measurements of a Pelagic 10" indicated that its lip was also made with three holes through it, all the holes being approximately 3⁄16 inch diameter. A 3⁄16 inch nominal diameter clevis pin was inserted through one of the holes. A teaching on the Lee Lures website states, in part: "Lure can be trolled as slow as 1.5 mph and will start to 'wander' at around 3 mph on up".

It was found during development of fishing lures embodying subject matter disclosed herein that using a 13⁄64 (0.2031) inch diameter drill bit to create the clearance hole for a 3⁄16 clevis pin, rather than an ANSI standard clearance hole, decreased the trolling speed at which a fishing lures embodying subject matter disclosed herein began to wander appreciably. It was also discovered that forming a tapered slot or a double-tapered slot through the lure lip for inserting the clevis pin through also decreased the trolling speed at which a fishing lures embodying subject matter disclosed herein began to wander appreciably.

There exists a need among anglers who desire fishing lures that do not have decreased wandering amplitude at increased depth settings and/or desire fishing lures that begin to wander at slower trolling speeds. Fishing lures that are subject matter disclosed herein allow a greater degree of substantially rigid connector (for example, a clevis pin) tilt, resulting in greater wandering action amplitude. Embodiments that are subject matter disclosed herein do not have decreased wandering action amplitude at increased depth settings. Embodiments that are subject matter disclosed herein begin to wander at slower trolling speeds than traditional wandering fishing lures.

Those skilled in the art will also appreciate that if two fishing lures are made substantially identical to each other, except that the lure lip of one fishing lure is smaller than the lure lip of the other fishing lure, the fishing lure with the smaller lure lip will have less resistance when being pulled through water. Anglers have individual personal preference limits on how much resistance they are willing to tolerate when reeling in a fishing lure. A fishing lure having a lure body and a lure lip that are both scaled up in size may exceed an angler's personal preference limit of resistance during retrieval of the fishing lure. Yet, the angler may desire a fishing lure with that larger lure body size. Subject matter disclosed herein addresses that need. Fishing lures with a disproportionately smaller lure lip and that exhibit a greater degree of rolling action by allowing a greater degree of substantially rigid connector tilt are among the subject matter disclosed herein.

SUMMARY

Embodiments described or otherwise contemplated herein substantially meet the aforementioned needs.

Fishing lures embodying subject matter disclosed herein have a lure body having a proximal end and a distal end extending longitudinally along a central axis, a proximal end region, and two substantially mirror image side surfaces. A lure lip is provided in the proximal end region of the lure body. The lure lip has a top surface and a bottom surface. The lure lip protrudes outwardly from the lure body at an angle to the central axis. A surface of the lure lip may be planar, comprise one or more curves, or comprise one or more bends. The outline of a surface of a lure lip may be generally isosceles trapezoidal (square, rectangular, kite, etc.), regular polygonal (pentagonal, hexagonal, heptagonal, octagonal, etc.), irregular polygonal, ovate, round, rounded, coffin-shaped, or hybrids thereof. One or a plurality of holes are provided through the lure lip. In some embodiments, the plurality of holes are spaced along a centerline of the lure lip. The holes in the lure lip are sized to receive a substantially rigid connector inserted through a selected one of them. At least one hole through the lure lip is manufactured with a major axis or diameter substantially greater than the diameter of an ANSI standard clearance hole for a corresponding nominal diameter substantially rigid connector. In embodiments in which the lure lip features a plurality of holes, at least two of the holes may be configurated differently from one another.

In an embodiment, a plurality of holes through the lure lip are manufactured cylindrical in shape, each cylindrical shape having a diameter, and the diameter of a more distal hole is greater than the diameter of a more proximal hole, such that when a substantially rigid connector is used in conjunction with the fishing lure, the substantially rigid connector is allowed to tilt to a greater degree in the more distal hole than in the more proximal hole. The diameters of the holes may be sized such that the fishing lure has substantially the same wandering action amplitude with the fishing lure moving at a given speed with a given amount of fishing line out in operation regardless of which hole the substantially rigid connector is positioned in. In other embodiments, the diameters of the holes may be sized such that the fishing lure has greater wandering action amplitude with the fishing lure moving at a given speed with a given amount of the same fishing line out in operation when the substantially rigid connector is positioned in the more distal hole than the most proximal hole.

In another embodiment, at least one hole through the lure lip is manufactured as a tapered slot. The tapered slot has a major axis at either the top surface or the bottom surface of the lure lip substantially perpendicular to the centerline of the lure lip, a minor axis perpendicular to its major axis, and is substantially round on the other surface of the lure lip. In embodiments in which the tapered slot is formed by tilting a drill bit side to side, the end of the tapered slot that is substantially round may be slightly ovate due to the angle of the tilted drill bit. The substantially round hole in this configuration has the same minor axis as the rest of the tapered slot. The tapered slot is configured to receive a substantially rigid connector and to allow the substantially rigid connector to tilt more in the tapered slot than the substantially rigid connector would be allowed to tilt in a cylindrical hole having the same diameter as the minor axis of the tapered slot. In an embodiment with a plurality of holes through the lure lip, the major axis of a tapered slot more distal than a more proximal hole may be sized such that the fishing lure has substantially the same amplitude of wandering action with the fishing lure moving at a given speed with a given amount of fishing line out in operation as it has when the substantially rigid connector is positioned in the more proximal hole. In other embodiments, the major axis of a tapered slot more distal than a more proximal hole may be sized such that the fishing lure has greater amplitude of wandering action with the fishing lure moving at a given speed with a given amount of fishing line out in operation than it has when the substantially rigid connector is positioned in the more proximal hole.

In another embodiment, at least one hole is manufactured as a double-tapered slot. The double-tapered slot has a first major axis at the top surface of the lure lip. The first major axis is substantially perpendicular to the centerline of the lure lip. A midsection of the double-tapered slot has a second major axis substantially perpendicular to the centerline of the lure lip. The double-tapered slot has a third major axis at the bottom surface of the lure lip. The third major axis is substantially perpendicular to the centerline of the lure lip. The double-tapered slot has a minor axis, substantially perpendicular to the three major axes. The double-tapered slot is configured to receive a substantially rigid connector. The double-tapered slot is configured to allow the substantially rigid connector to tilt more in the double-tapered slot than it would be allowed to tilt in a cylindrical hole having the same diameter as the minor axis of the double-tapered slot. In an embodiment with a plurality of holes through the lure lip, the first major axis and the third major axis of a double-tapered slot more distal than a more proximal hole may be sized such that the fishing lure has substantially the same amplitude of wandering action with the fishing lure moving at a given speed with a given amount of fishing line out in operation as it has when the substantially rigid connector is positioned in the more proximal hole. In other embodiments, the first major axis and the third major axis of the double-tapered slot more distal than a more proximal hole may be sized such that the fishing lure has greater amplitude of wandering action with the fishing lure moving at a given speed with a given amount of fishing line out in operation than it has when the substantially rigid connector is positioned in the more proximal hole.

A fishing lure embodying subject matter disclosed herein for connection to a substantially rigid connector having a nominal diameter can be made by providing a lure body extending longitudinally along a central axis, providing a lure lip having a centerline, forming at least one hole through the lure lip along its centerline, the at least one hole having a substantially greater major axis or diameter than the diameter of an ANSI standard clearance hole for the corresponding nominal diameter of the substantially rigid connector, and attaching the lure lip to the lure body at an angle relative to the central axis of the lure body.

In an embodiment, the lure lip may be made with a plurality of cylindrical holes, with the smallest diameter hole being more proximal than a more distal hole having a larger diameter.

In an embodiment, the lure lip may be made with a tapered slot. The tapered slot has a major axis cross-directional to the centerline of the lure lip, and there may be at least another hole through the lure lip. The tapered slot may be more distal than a more proximal hole having a smaller major axis or diameter.

In an embodiment, at least one hole may be a double-tapered slot having a first major axis at a top surface of the lure lip, a second major axis at its midsection, and a third major axis at a bottom surface of the lure lip. The first major axis, second major axis, and third major axis are substantially perpendicular to the centerline of the lure lip. The double-tapered slot has a minor axis along the centerline of the lure lip. The double-tapered slot may have longer first and third major axes than a more proximal hole having a shorter major axis or diameter.

In some fishing applications, a user may prefer a fishing lure embodying subject matter disclosed herein having a non-ANSI standard cylindrical clearance hole over a fishing lure embodying subject matter disclosed herein having a tapered slot with a major axis equal to the diameter of the cylindrical hole. A cylindrical hole greater in diameter than an ANSI standard clearance hole allows the substantially rigid connector to not only tilt side to side, but forward as well, decreasing the dive angle and operating depth of the fishing lure. One application in which this may be desirable is in practicing the method of fishing using a plurality of fishing lures described in greater detail later in this disclosure.

In some other fishing applications, a user may prefer a tapered slot or double-tapered slot over a cylindrical hole having a diameter equal to the major axis of the tapered slot or a major axis of a double-tapered slot. The slot restrains the substantially rigid connector from tilting forward along the centerline of a lure lip, so the dive angle and operating depth of the fishing lure are not changed.

In embodiments in which positioning of the substantially rigid connector in a more distal hole results in the same amplitude of wandering as when the substantially rigid connecter is positioned in a more proximal hole, the distal end of the fishing lure may swing side to side ("tail wiggle") more in operation when the substantially rigid connector is positioned in the more distal hole than when it is positioned in the more proximal hole. This results in the fishing lure having consistent wandering aptitude at all settings plus choices of tail wiggle action an angler can select from by positioning the substantially rigid connector in the hole through the lure lip producing the desired tail wiggle action.

Subject matter disclosed herein includes a lure lip for a fishing lure. The lure lip may be substantially a plate having a plurality of holes each configured to allow a substantially rigid connector to have differing degrees of predetermined tilt relative to a top surface of the lure lip when the substantially rigid connector is inserted thereto. The holes may be cylindrical and of differing diameters. One or more of the holes may be a tapered slot. One or more of the holes may be a double-tapered slot.

Subject matter disclosed herein includes a method of making a fishing lure, comprising forming hole(s) in a lure lip and attaching the lure lip to a lure body. For example, a lure maker may decide whether to form hole(s) in the lure lip before or after assembly of the lure lip to the lure body. If the lure maker decides to form the hole(s) before assembly, then the lure maker proceeds with forming a hole through the lure lip before assembly. The hole may be a cylindrical hole, a tapered slot, or a double-tapered slot. The lure maker decides whether to form one or more additional holes, configured differently from the first hole formed. The differently configurated hole(s) may be cylindrical hole(s) with differing diameter(s), one or more tapered slots, and/or one or more double-tapered slots. The lure maker attaches the lure lip to the lure body. However, the lure maker may instead decide to attach the lure lip to the lure body before forming the hole(s) through the lure lip, or the lure maker may decide to form at least one hole before assembly and at least another hole after assembly.

Subject matter disclosed herein also includes a kit comprising at least two fishing lures, each of the fishing lures comprising a lure body having a proximal end and a distal end extending longitudinally along a central axis, a proximal end region, and two side surfaces. Each of the at least two fishing lures has a lure lip provided in the proximal end region of the lure body having a top surface and a bottom surface. The lure lip protrudes outwardly from the lure body at an angle to the central axis, and at least one hole is provided through the lure lip. The hole(s) through the lure lip are sized to receive a substantially rigid connector inserted through a selected one of them and are configured to enable the substantially rigid connector to tilt in operation of the fishing lure. At least one hole in one fishing lure's lip is configured differently from at least one hole in a second fishing lure's lure lip, and the holes in the lure lips of the at least two fishing lures are configured such that the at least two fishing lures have substantially the same wandering action with the fishing lure moving at a given speed while each of the at least two fishing lures is connected to a different amount of fishing line out in operation. The lips of the at least two fishing lures may be configured substantially identical to each other and a substantially rigid connector may be inserted through a more proximal hole in the lure lip of one fishing lure and another substantially rigid connector through a more distal hole in the lure lip of a second fishing lure.

The kit may comprise at least three fishing lures, the third fishing lure having a lure lip with a hole through it that is configured differently from a hole through the lure lip of a first fishing lure and also configured differently from a hole through the lure lip of a second fishing lure in the kit. The lips of the at least three fishing lures may each have one hole through them or may be configured substantially identical to each other, each having a most proximal hole, a most distal hole configured differently from the most proximal hole, and a third hole in between the other two and configured differently from the other two.

In operation of a kit comprising three identically configured fishing lures having, for example, three holes through their lure lips, a substantially rigid connector is placed through the most proximal hole of the lure lip of a fishing lure to be trolled in a trailing position in an array of three fishing lures trailing behind the tip eyes of fishing rods mounted on a gunnel of a boat in motion. A substantially rigid connector is placed through the most distal hole of the lure lip of a fishing lure to be trolled in a leading position in an array. A substantially rigid connector is placed through the hole between the most proximal hole and the most distal hole through the lure lip of a fishing lure to be trolled in an intermediate position in an array.

In another exemplary embodiment, each of the plurality of fishing lures is configured with a single hole through its lure lip configured for the fishing lure to be used in a particular location in operation in the array (leading, trailing, or intermediate) and the hole through each lure lip is configured differently than the holes in the lure lips of the other fishing lures in the kit. Other combinations and numbers of differently configured holes through lure lips are within the scope of the subject matter disclosed herein.

It will be understood by those skilled in the art that fishing lures embodying subject matter disclosed herein can be made in sizes suitable for catching fish of a wide range of sizes and species. The upper and lower contours of the fishing lure, as viewed from the side, can be any number of shapes, including arch shaped, drop-belly shaped, straight, straight with sloped ends, tapered, fusiform, or other shapes without departing from the subject matter claimed herein. It will also be appreciated by those skilled in the art that the thicker and/or harder the material that the lure lip is made from is, the more durable the tolerances of the holes through the lure lip will be over repeated use.

The above summary is not necessarily intended to describe each illustrated embodiment or every implementation of the subject matter hereof. The figures and the detailed description that follow more particularly exemplify these embodiments.

BRIEF DESCRIPTION OF THE DRAWINGS

Subject matter hereof may be more completely understood in consideration of the following detailed description of various embodiments of the subject matter in connection with the accompanying drawings, in which:

FIG. 25D further illustrates that a wandering fishing lure embodying subject matter hereof reaches a maximum extent of wandering amplitude greater than a traditional wandering lure before reaching the point in its cycle at which the amount of lure body tilt causes the wandering fishing lure to start wandering back toward its overall course centerline.

Figure 1:
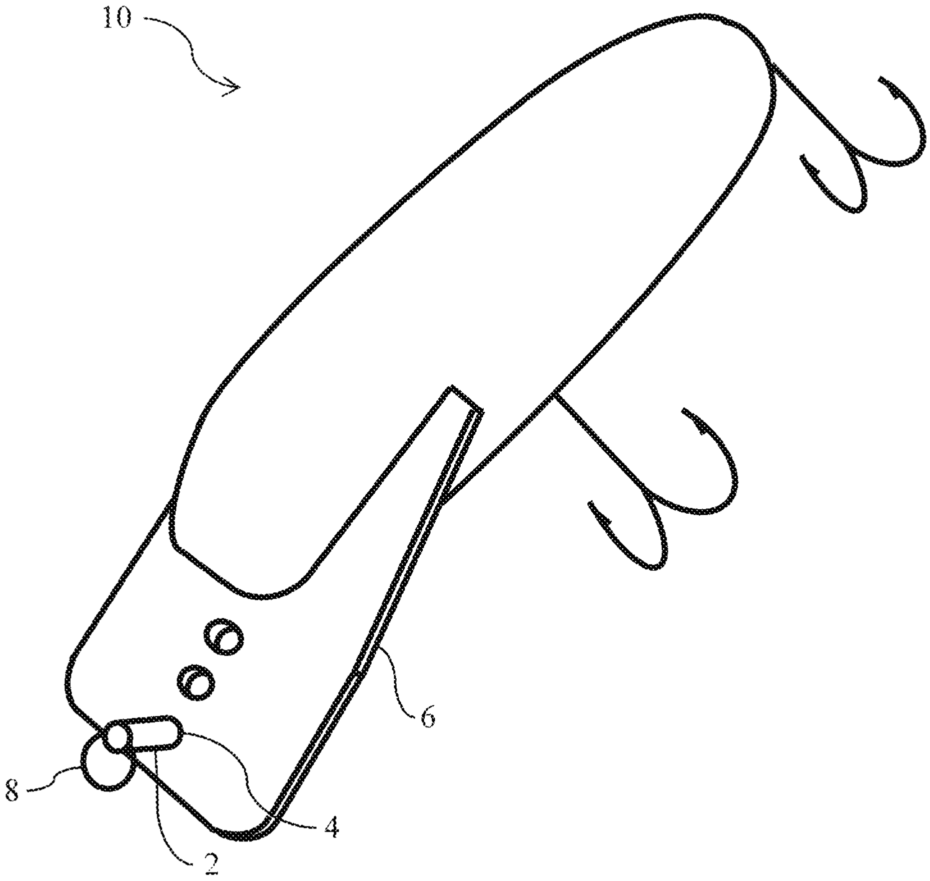
FIG. 1 illustrates a perspective view of an embodiment of a fishing lure embodying subject matter disclosed herein, with a clevis pin having a cylindrical portion positioned through a hole in the lure lip and a split ring attached to the clevis pin.

While embodiments are amenable to various modifications and alternative forms, specifics thereof have been shown by way of example in the drawings and will be described in detail. It should be understood, however, that the intention is not to limit subject matter hereof to the particular embodiments described. On the contrary, the intention is to cover all modifications, equivalents, and alternatives falling within the spirit and scope of subject matter hereof in accordance with the appended claims.

DETAILED DESCRIPTION

Fishing lures and lure lips described in greater detail by way of example herein provide improved wandering action and/or improved rolling action. Also described in greater detail by way of example herein are fishing lures having the same or greater wandering amplitude at settings configured to increase tail wiggle. Also described in greater detail by way of example herein is a method of making fishing lures having improved wandering action and/or rolling action. Also described in greater detail by way of example herein are kits comprising fishing lures having improved wandering action and/or rolling action. Also described in greater detail by way of example herein is a method of fishing with a plurality of wandering fishing lures embodying subject matter disclosed herein.

Referring now to FIG. 1, in an embodiment, a fishing lure 10 may be connected to a fishing line (not shown) with a substantially rigid connector 2 positioned in a hole 4 in a lure lip 6 and a split ring 8 attached to the substantially rigid connector 2 for connecting the fishing line (not shown) to. The fishing line may be attached directly to the split ring 8 or by means of a snap (not shown) connected to the fishing line. An exemplary, substantially rigid connector is a Hard-to-Find Fastener brand, model 014973472542 alloy steel single hole clevis pin, 3/16 inch nominal diameter by 5/8 long, having a substantially straight shaft, available online at www.amazon.com. Hole 4 is larger in diameter than an ANSI standard clearance hole for the diameter of the shaft of the substantially rigid connector.

A headless clevis pin secured on one end with a pin or split ring through a hole in it may be substituted for the single hole clevis pin. Optionally, a washer may be placed over the headless clevis pin after a pin or split ring is inserted through a hole in it and before the headless clevis pin is inserted through the hole in the lure lip. Longer or shorter clevis pins may be used. Other substantially rigid connectors may be substituted; for example, a metallic or plastic upright member that can be inserted through a hole in a lure lip and be restrained by its configuration from pulling out of the lure lip in operation. A bolt, screw, or rivet can be suitably configured by drilling a clearance hole through it for attachment of a split ring, or a locknut could be installed on the threaded portion of a bolt or screw so that a snap can be attached directly to the bolt or machine screw. The lure lip may be made from aluminum, steel, stainless steel, titanium, brass, substantially rigid plastic, or other substantially rigid material.

Figure 2:
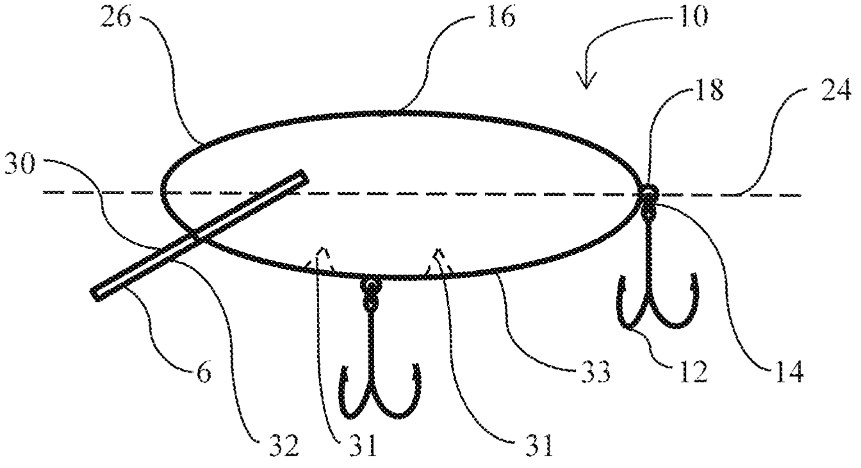
FIG. 2 illustrates a side view of an exemplary fishing lure embodying subject matter disclosed herein.

Referring to FIG. 2, in an embodiment, a fishing lure 10 has at least one hook 12. An exemplary hook is a Mustad brand, model 3551 treble hook, size 5/0, available from Thorne Brothers Custom Rod & Tackle at 10091 Central Ave NE, Blaine, MN 55434. A split ring 14 may attached to the at least one hook. An exemplary split ring is a Wolverine Tackle brand, size #5, available from Thorne Brothers Custom Rod & Tackle. In an embodiment of a fishing lure 10 wherein the lure body 16 is made from wood, the split ring is also attached to a screw eye 18. Optionally, the hook may be attached directly to an open eye screw eye, the screw eye being subsequently closed during assembly of the hook thereto without an intermediate split ring. An exemplary screw eye is a LurePartsOnline model 4028 0.092" Magnum Screw Eye, closed eye style, 1½" long available at www.lurepartsonline.com. Optionally, a liquid adhesive material may be applied to a threaded region of screw eye 18 before it is screwed into the lure body 16 made from wood. A wire loop threaded through the lure body in a through-wire configuration may also be substituted for a screw eye. In an embodiment wherein fishing lure 10 has a lure body 16 made from material(s) other than wood, other fish hook connection means may be substituted. For example, if the lure body is molded from plastic, a wire loop molded into the lure body may be substituted for the screw eye.

A lure body 16 made from wood may optionally be coated with a wood sealant. The lure body 16 may optionally be painted with a pattern pleasing to the lure maker. The lure body 16 may optionally be sealed with one or more coatings of epoxy.

Figure 3:
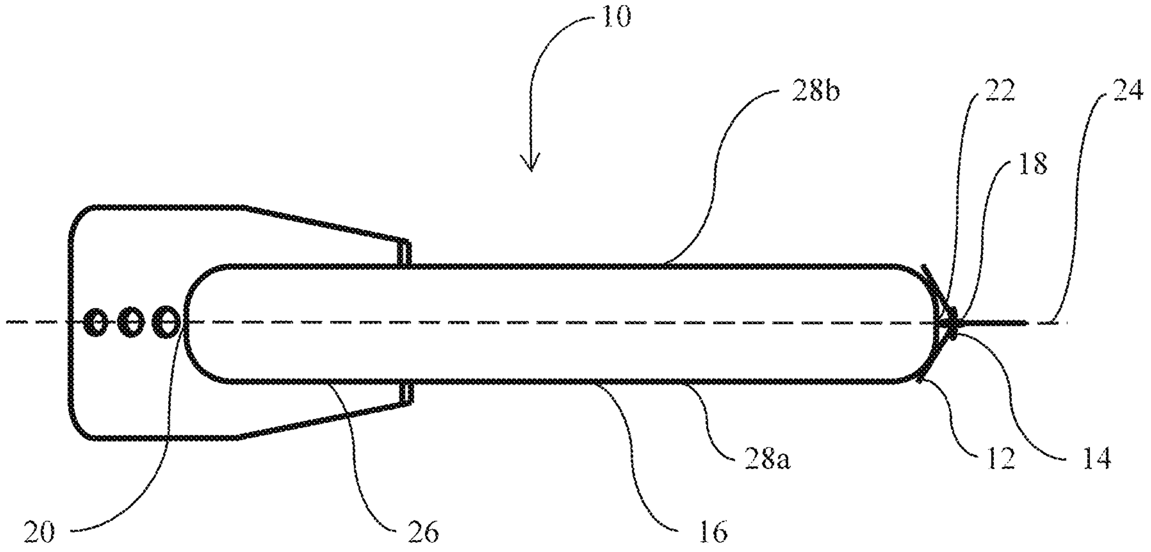
FIG. 3 illustrates a top view of an exemplary fishing lure embodying subject matter disclosed herein.

Referring to FIG. 3, in an embodiment, a fish lure 10 has a lure body 16 having a proximal end 20 and a distal end 22 extending longitudinally along a central axis 24, a proximal end region 26, and two side surfaces 28*a* and 28*b* that are substantially mirror images of each other. An example of suitable material from which the lure body 16 can be made is a Menards model number 1072612 1¼ inch by 6 inch by 3 foot long red cedar decking board available at Menards retail stores, having a headquarters at 5101 Menard Drive, Eau Claire, WI 54703.

Referring again to FIG. 2, in an embodiment, a lure lip 6 is provided in the proximal end region 26 of the lure body 16. The lure lip 6 may be secured to the lure body 16 using an adhesive material. Optionally, additional securement of the lure lip 6 to the lure body 16 may be achieved, for example, by drilling a hole through the lure body 16 and lure lip 6 after they are assembled to each other and then inserting a pin or screw through the drilled hole. The lure lip 6 has a top surface 30 and a bottom surface 32. The lure lip 6 protrudes outwardly from the lure body 16 along a plane at an angle to the central axis 24. It will be understood by those skilled in the art that in various embodiments lure lip 6 may be planar, comprise one or more curves, or comprise one or more bends. In embodiments in which the lure body 16 is made from wood, one or more weights 31 may be inserted into holes drilled in a bottom surface 33 of the lure body 16. Such holes are drilled along, and generally perpendicular to, bottom surface 33, after which they are filled with a suitable weighing material, such as lead, to enable the fishing lure to float under static conditions with its side surfaces 28*a* and 28*b* in a desired orientation.

In some embodiments, a desired orientation during static flotation of a fishing lure 10 having substantially mirror image side surfaces 28*a* and 28*b* that are substantially planar is that the side surfaces 28*a* and 28*b* remain substantially vertical during static flotation, and distal end 22 floats at the same elevation as proximal end 20 or floats higher in elevation than proximal end 20.

In operation, an angler attaches the fishing lure 10 using a substantially rigid connector 2 positioned in the lure lip 6, which in turn is connected to a fishing line, directly or with a split ring 8 or a split ring 8 in combination with an attachment device such as a snap, the fishing line typically being connected to the angler's reel mounted on a fishing rod. An exemplary snap is a Mustad brand Stay-Lok Snap, size #5, available from Thorne Brothers Custom Rod & Tackle at 10091 Central Ave NE, Blaine, MN 55434. The angler casts the fishing lure 10 or releases a desired amount of line from the angler's reel with the angler's boat in motion to troll the fishing lure 10 behind the boat. The geometric relationships between the lure lip 6 and lure body 16 cause the fishing lure 10 to be unstable in the horizontal plane during motion in the water and wandering action results. The clearance between the inside of hole 4 and the substantially rigid connector 2 enables the substantially rigid connector 2 to both tilt and swivel. The angler, in this example, mounts the fishing rod to the boat such that the tip eye of the fishing rod is along the centerline of the boat. Increased clearance between the substantially rigid connector 2 and a hole 4 through the lure lip 6 that receives the substantially rigid connector 2 allows the fishing lure to travel further out to a side, away from a boat's course centerline, before being restrained by the substantially rigid connector 2 resting on a corner formed by the hole and the top surface of the lure lip, such that the fishing lure 10 tips sideways to its maximum extent and course corrects back toward the centerline of the boat's direction of travel.

Figure 4:
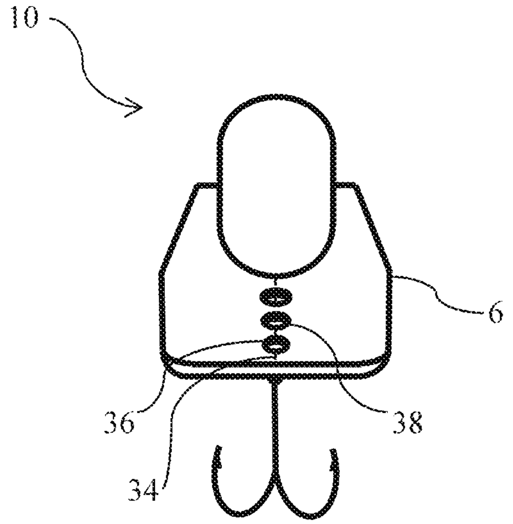
FIG. 4 illustrates a front view of the proximal end of an exemplary fishing lure embodying subject matter disclosed herein.

Referring to FIG. 4, in an embodiment, a plurality of holes may be provided through the lure lip 6 being spaced along a centerline 34 of the lure lip 6 such that there is at least a proximal hole 36 and at least a more distal hole 38. The holes in the lure lip 6 are sized to receive a substantially rigid connector 2 positioned in a selected one of them. In embodiments, at least one hole through the lure lip 6 is manufactured to be configured differently from an other hole through the lure lip.

Wandering fishing lures of various lengths may be made by scaling up or down the proportions of the lure lip and lure body shown in FIGS. 1, 2, 3, and 4. However, these relative proportions are not limiting and fishing lures made, for example, with lure lips wider or longer in proportion to the lure body may also have suitable wandering action amplitude.

Figure 5:
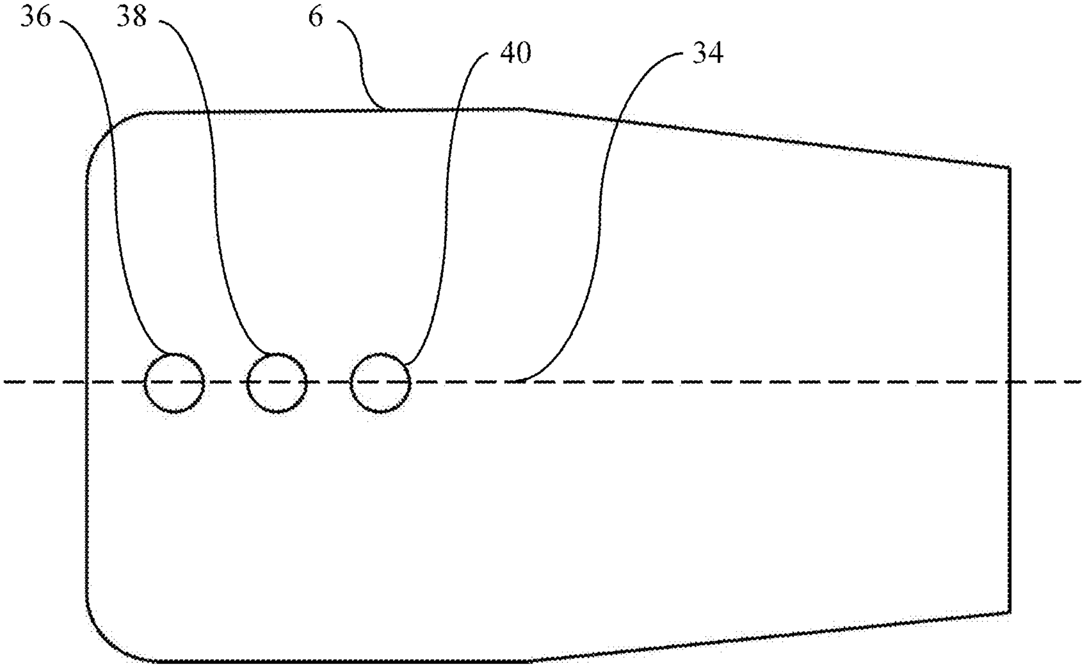
FIG. 5 illustrates a top view of an exemplary lure lip embodying subject matter disclosed herein, wherein all the holes are cylindrical and larger in diameter than the diameter of an ANSI standard clearance hole for a clevis pin of a selected nominal diameter.

Referring to FIG. 5, in an embodiment, cylindrical holes 36, 38, and 40 through a lure lip 6 may all be the same diameter and manufactured substantially along the centerline 34 of the lure lip 6, the holes being oversized in comparison to ANSI standard diameter clearance holes for the substantially rigid connector they are designed to receive. For example, such oversized holes for receiving a 3⁄16 inch nominal diameter substantially rigid connector, such as a clevis pin, may be drilled to 13⁄64 inch diameter or greater, rather than an ANSI standard diameter clearance hole.

Figure 6:
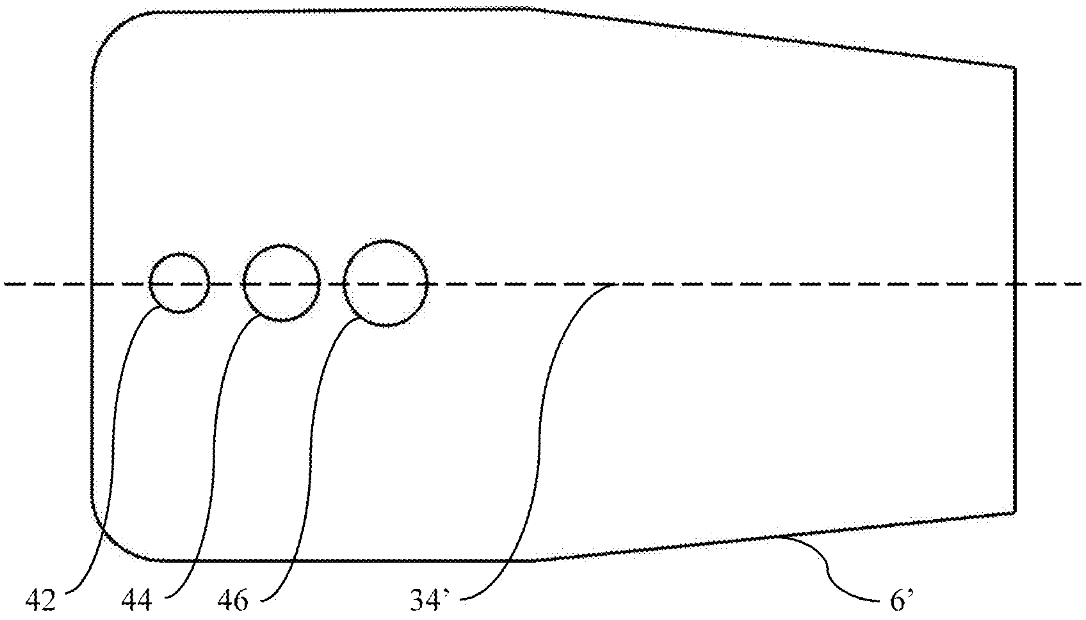
FIG. 6 illustrates a top view of an exemplary lure lip embodying subject matter disclosed herein, wherein a more distal cylindrical hole is larger in diameter than a more proximal cylindrical hole is in diameter.

Referring to FIG. 6, in another embodiment, a plurality of holes through a lure lip 6' are manufactured cylindrical in shape along centerline 34', each cylindrical hole having a diameter, a more proximal hole configured differently than a more distal hole in that the diameter of the more proximal hole 42 is less than the diameter of the more distal hole 44, and such that when a substantially rigid connector is used in conjunction with the fishing lure, the substantially rigid connector is allowed to tilt to a greater degree in the more distal hole 44 than in the more proximal hole 42. The lure lip 6' may have at least another even more distal hole 46. The diameters of the holes may be sized such that the fishing lure has substantially the same wandering action amplitude with the fishing lure moving at a given speed with a given amount of fishing line out in operation regardless of which hole the substantially rigid connector is positioned in. In other embodiments, the diameters of the holes may be sized such that the fishing lure has greater wandering action amplitude with the lure moving at a given speed with a given amount of the same fishing line out in operation when the substantially rigid connector is positioned in a more distal hole than the most proximal hole.

Traditional wisdom indicates that using an ANSI standard diameter clearance hole for a 3⁄16 inch nominal diameter clevis pin results in predictable action and the maximum resistance of lure lip material against the head of the clevis pin being pulled through the clearance hole if the fishing lure catches a fish or strikes an obstruction while it is being trolled. However, it was determined through experimentation that larger holes can be used, especially if the lure is manufactured with a thicker lure lip than the traditional lures discussed in the Background section hereof. Alternatively to, or in conjunction with, a thicker lure lip, a flat washer may be placed over the shank of the clevis pin before it is inserted through a hole in the lure lip.

Fishing lures embodying subject matter disclosed herein can be made that have three cylindrical holes through their lure lips, each progressively larger in diameter. For example, the most proximal hole may be formed using a 13⁄64 inch diameter drill bit, the middle hole may be formed using a 7⁄32 inch diameter drill bit, and the most distal hole may be formed using a 15⁄64 inch drill bit. The diameters a lure maker decides to make in the progression may depend on overall fishing lure hydrodynamic characteristics. For example, in some embodiments a progression of 1⁄4 inch, 13⁄63 inch, and 7⁄32 inch are desirable. In other embodiments, a progression of metric hole diameters may be formed for receiving a substantially rigid connector. In other embodiments, such as when the holes are formed by a method other than drilling, other diameter size progressions may be formed.

In an embodiment, a 3⁄16 inch nominal diameter clevis pin is positioned in a selected one of the holes at a time. In an embodiment with three holes, depending on the spacing of the holes along the centerline of the lure lip, the wandering action amplitude of the fishing lure in operation is substantially the same or increased as the position of the substantially rigid connector is changed from the most proximal hole to either of the other two holes, and the tail wiggle action is greater the further distal the substantially rigid connector is positioned in the lure lip.

The clevis pin is also enabled to tip in the distal and proximal directions more in the 7⁄32 inch diameter hole than in the 13⁄64 inch hole, and more in the 15⁄64 inch diameter hole than in the 7⁄32 diameter hole. In embodiments, an advantage of this configuration having a plurality of cylindrical holes is that it is easy to make the holes by drilling or punching. This configuration may be used in embodiments in which it is desirable to enable substantially rigid connector to tilt distally and proximally in operation, and not just side-to-side, cross-directionally to the centerline of the lure lip.

Figure 7:
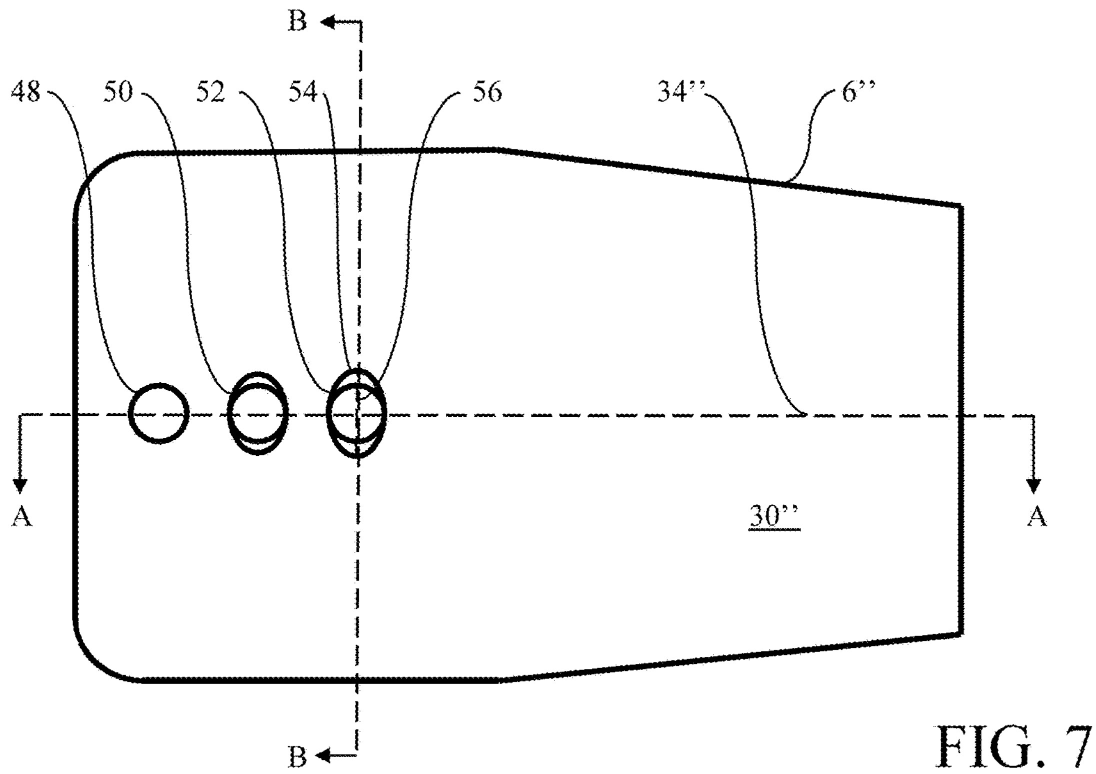
FIG. 7 illustrates a top view of an exemplary lure lip embodying subject matter disclosed herein, wherein at least one hole is a tapered slot.

Referring to FIG. 7, in yet another embodiment, at least one of holes 48, 50, or 52 through lure lip 6" is manufactured as a tapered slot 54, configured to prevent a substantially rigid connector from tilting as much distally and proximally in operation as the rigid connector is enabled to tilt cross-directionally to the centerline of the lure lip. The tapered slot 54 has a major axis 56 at either the top surface 30" or bottom surface 32" of the lure lip 6" substantially perpendicular to the centerline 34" of the lure lip 6" and is substantially round on the opposite surface of the lure lip 6". If the tapered slot 54 is created before the lure lip 6" is assembled to the lure body, which surface of the lure lip 6" is the top surface and which is the bottom surface is not determined until assembly. Although illustrated with major axis 56 at top surface 30" of the lure lip 6", major axis 56 may instead be at bottom surface 32" of the lure lip 6".

Figure 8:
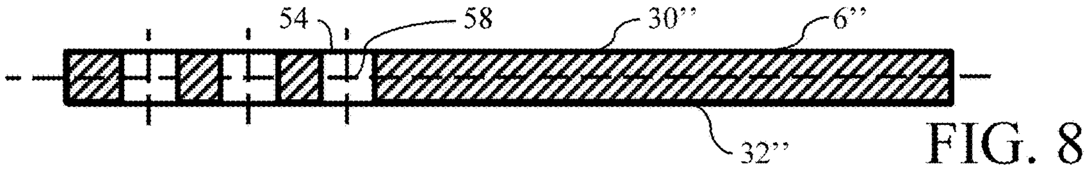
FIG. 8 illustrates a cross-sectional view of the exemplary lure lip shown in FIG. 7 along line A-A thereof.

Referring to FIG. 8, the tapered slot also has a minor axis 58, which is substantially perpendicular to major axis 56 shown in FIG. 7.

Figure 9:
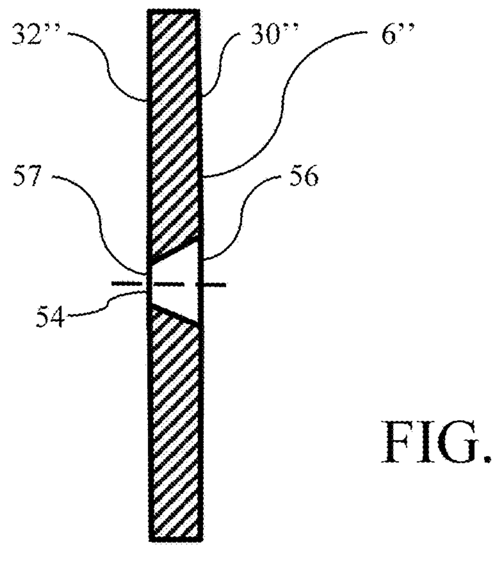
FIG. 9 illustrates a cross-section of the exemplary lure lip shown in FIG. 7 along line B-B thereof.

Referring to FIG. 9, the tapered slot 54 is configured to receive a substantially rigid connector and to allow the substantially rigid connector to tilt more in the tapered slot 54 than the substantially rigid connector would be allowed to tilt in a cylindrical hole having the same diameter as the minor axis of tapered slot 54. The major axis of a tapered slot more distal than a more proximal hole having a smaller diameter or major axis may be sized such that the fishing lure has substantially the same amplitude of wandering action with the lure moving at a given speed with a given amount of fishing line out in operation as it has when the substantially rigid connector is positioned in the more proximal hole. In other embodiments, the major axis of a tapered slot more distal than a more proximal hole having a smaller diameter or major axis may be sized such that the fishing lure has greater amplitude of wandering action with the lure moving at a given speed with a given amount of fishing line out in operation than it has when the substantially rigid connector is positioned in the more proximal hole.

In an exemplary embodiment, three cylindrical holes can, for example, be drilled through the lure lip of a fishing lure using a 13⁄64 inch diameter drill bit. The most distal hole can then be re-machined from the top into a tapered slot by tilting the drill bit side to side cross-directionally to the centerline of the lure lip at, for example, approximately 25 degrees to either side from the top side of the lure lip. The resulting shape of the tapered slot at the bottom of the lure lip will be slightly ovate, yet substantially round. The middle hole can be modified from cylindrical to a tapered slot as well, but configured differently, made by tilting the drill bit side to side cross-directionally to the centerline of the lure lip, for example, approximately half as much as it was tilted to make the most distal hole. If the tapered slot is made by tilting a drill bit, the tapered slot will have a second major axis 57 substantially perpendicular to the centerline of the lure lip at the surface of the lure lip that the drill bit exited the lure lip. The second major axis 57 will be slightly wider than the diameter of the drill bit, due to the drill bit machining the tapered slot at an angle. Though the exit formed by tilting the drill side to side creates a slightly ovate shape at the blind side surface of the lure lip, the shape will still be substantially round. However, a tapered slot can be formed by other metal removal or forming processes such that there is no second major axis created, the tapered slot being more truly round on the blind side surface of the lure lip.

Figure 9A:
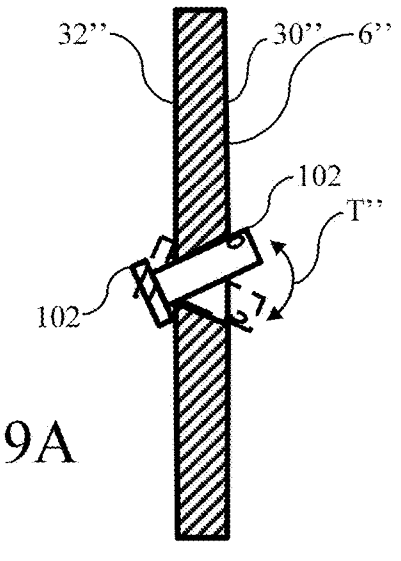
FIG. 9A illustrates a cross-section of the exemplary lure lip shown in FIG. 7 along line B-B thereof, with a substantially rigid connector inserted through the exemplary lure lip.

Referring to FIG. 9A, a substantially rigid connector 102 is positioned through a tapered slot. The tapered slot enables the substantially rigid connector 102 to tilt side to side in operation, the motion of which is indicated by T".

Substantially rigid connector 102, for example, a 3⁄16 inch diameter clevis pin can be positioned in a select one of each of the three holes and to achieve a desired wandering action in operation at each clevis pin position in the lure lip. The desired wandering action may be approximately equal at each pin position, or greater with the clevis pin positioned in a hole more distal than a hole more proximal, depending on the spacing of the tapered slots along the centerline of the lure lip and the angle at which each tapered slot was formed.

Those skilled in the art will appreciate that if two fishing lures are made substantially identical to each other, except that the lure lip of one fishing lure is smaller than the lure lip of the other fishing lure, the fishing lure with the smaller lip will have less resistance when being pulled through water. Anglers have individual personal preference limits as to how much resistance they are willing to tolerate when reeling in a fishing lure. A lure body and lure lip both scaled up proportionately in size may exceed an angler's personal preference limit of resistance. Yet, the angler may desire a fishing lure with that larger lure body size. In an embodiment, a fishing lure can be made with a lure lip not fully scaled up in proportion to the scaled-up lure body. A cylindrical hole may be drilled through the lure lip and then re-machined into tapered slot. A clevis pin may be positioned in the tapered slot. In operation, such a fishing lure with a smaller, not-scaled-up lure lip will have less wandering action amplitude than it would if it had been made with a lure lip scaled up proportionately to the lure body. However, due to the clevis pin being allowed to tilt side to side in the tapered slot, the fishing lure will have greater side to side rolling action when trolled behind a boat, rotating partially about the central axis of the lure body in one direction (e.g., clockwise) and then rotating partially about the central axis of the lure body in the opposite direction (e.g., counterclockwise), than the fishing lure had before the hole was modified from a cylindrical hole to a tapered slot.

Figure 10:
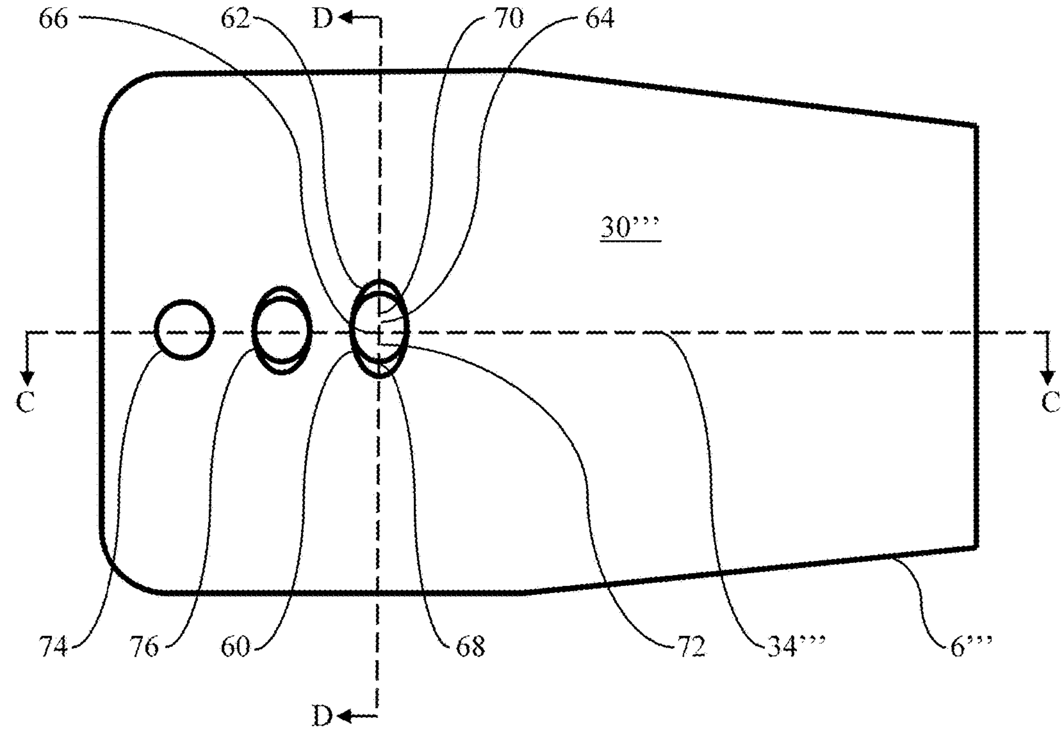
FIG. 10 illustrates a top view of an exemplary lure lip embodying subject matter disclosed herein, wherein at least one hole is double-tapered slot.

Referring to FIG. 10, in even yet another embodiment, at least one hole 60 is manufactured as a double-tapered slot 62. The double-tapered slot 62 has a first major axis 64 at top surface 30''' of lure lip 6'''. The first major axis 64 is substantially perpendicular to centerline 34''' of lure lip 6'''. A second major axis 70 is also substantially perpendicular to the centerline 34'''.

Figure 11:
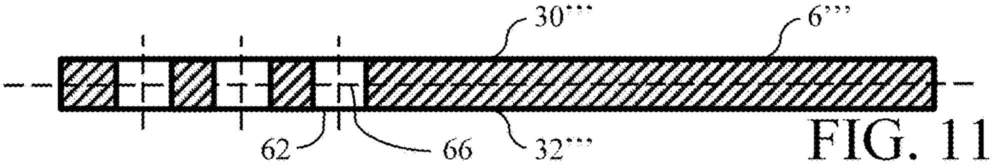
FIG. 11 illustrates a cross-sectional view of the exemplary lure lip shown in FIG. 10 along line C-C thereof.

Referring to FIG. 11, the double-tapered slot 62 has a minor axis 66 extending linearly from top surface 30''' to bottom surface 32''' of lure lip 6'''.

Figure 12:
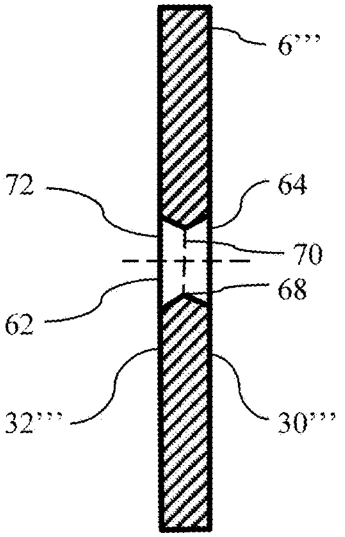
FIG. 12 illustrates a cross-section of the exemplary lure lip shown in FIG. 10 along line D-D thereof.

Referring to FIG. 12, second major axis 70 is formed at midsection 68 of the double-tapered slot 62. The double-tapered slot has a third major axis 72 on the bottom side 32''' of lure lip 6'''. In some embodiments, third major axis 72 of the double-tapered slot 62 may be substantially the same length at the bottom surface 32''' of lure lip 6''' as first major axis 64 is at the top surface 30''' of lure lip 6'''. In other embodiments, lure lip 6''' may be manufactured such that the first major axis 64 and the third major axis 72 have lengths that differ from each other, and as a result, the second major axis 70 will not be equidistant from the top surface and bottom surface of the lure lip.

In an embodiment, a fishing lure with a plurality of 13/64 inch diameter holes can, for example, be modified by re-machining the most distal hole, tilting the 13/64 inch drill bit approximately 12 degrees side to side cross-directionally to the centerline of the lure lip to create a tapered slot. Then the lure lip can then be turned over to expose the opposite surface and the re-machining process repeated, tilting the 13/64 inch drill bit approximately 12 degrees side to side cross-directionally to the centerline of the lure lip to create a double-tapered slot. Another hole located in between the most proximal hole and the most distal hole may be configured differently, forming a double-tapered slot by tilting the drill bit side to side by, for example, approximately six degrees.

In an embodiment, a double-tapered slot can, for example, be formed by tilting the drill bit back and forth more on one side of the lure lip than on the other side of the fishing lure lip, resulting in a double-tapered slot that is not symmetrical.

A double-tapered slot can be formed by other metal removal or forming processes such that the length of the second major axis 70 is substantially equal in length to minor axis 66.

The double-tapered slot 62 is configured to receive a substantially rigid connector. The double-tapered slot 62 is configured to allow the substantially rigid connector to tilt more in the double-tapered slot 62 than it would be allowed to tilt in a cylindrical hole having the same diameter as the length of minor axis 66 of the double-tapered slot 62.

Referring again to FIG. 10, lure lip 6''' may have one or more additional holes. The most proximal hole 74 is illustrated as a cylindrical hole, but it may instead be a tapered slot or a double-tapered slot. Also in FIG. 10, a middle hole 76 is illustrated as a double-tapered slot, but it may instead be a cylindrical hole or a tapered slot.

Figure 12A:
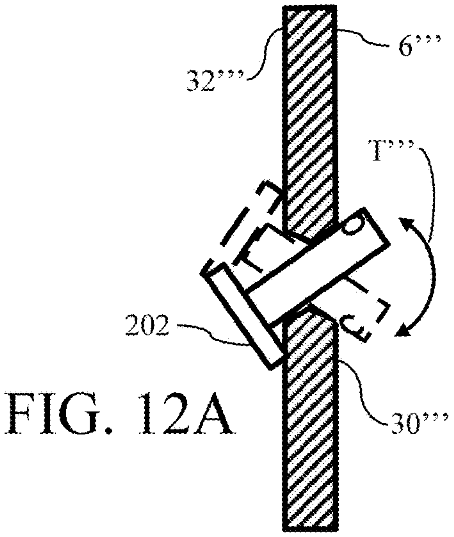
FIG. 12A illustrates a cross-section of the exemplary lure lip shown in FIG. 10 along line D-D thereof, with a substantially rigid connector inserted through the exemplary lure lip.

Referring to FIG. 12A, a substantially rigid connector 202 is positioned through a double-tapered slot. The doubled-tapered slot enables the substantially rigid connector 202 to tilt side to side in operation, the motion of which is indicated by T'''.

The holes in lure lip 6''' may be configured such that when the substantially rigid connector 202 is positioned in any one of them the fishing lure has substantially the same amplitude of wandering action with the lure moving at a given speed with a given amount of fishing line out in operation. In other embodiments, the holes in the lure lip may be configured such that when the substantially rigid connector is positioned in a hole more distal than a more proximal hole, the fishing lure has greater amplitude of wandering action with the lure moving at a given speed with a given amount of fishing line out in operation than it has when the substantially rigid connector is positioned in the more proximal hole.

In an embodiment, a fishing lure can be made with a lure lip not fully scaled up in proportion to the scaled-up lure body. A cylindrical hole may be drilled through the lure lip and then re-machined into a double-tapered slot. A clevis pin may be positioned in the double-tapered slot. In operation, such a fishing lure with a smaller, not-scaled-up lure lip will have less wandering action amplitude than it would if it had been made with a lure lip scaled up proportionately to the lure body. However, due to the clevis pin being allowed to tilt side to side in the double-tapered slot, the fishing lure will have greater side to side rolling action when trolled behind a boat, rotating partially about the central axis of the lure body in one direction (e.g., clockwise) and then rotating partially about the central axis of the lure body in the opposite direction (e.g., counterclockwise), than the fishing lure had before the hole was modified from a cylindrical hole to a double-tapered slot.

Figure 13:
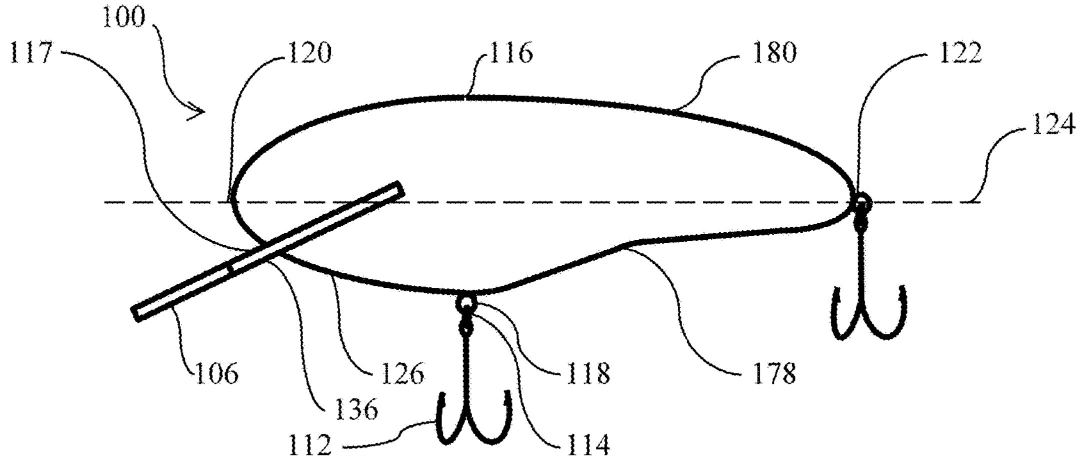
FIG. 13 illustrates a side view of another exemplary fishing lure embodying subject matter disclosed herein.

Referring to FIG. 13, illustrating a side view of another exemplary fishing lure, a fishing lure 100 has a lure body 116 having a proximal end 120 and a distal end 122 extending longitudinally along a central axis 124, and a proximal end region 126. A lure lip 106 protrudes outwardly from the lure body 116 along a plane at an angle to the central axis 124. Lure lip 106 and has a top surface 117 and a bottom surface 136. At least one screw eye 118 is attached to lure body 116. A split ring 114 is attached to screw eye 118. At least one hook 112 is attached to the split ring 114. The lure body 116 has a curved bottom ("drop belly") surface 178 extending from the proximal end 120 to the distal end 122. The lure body 116 also has a curved upper surface 180 extending from the proximal end 120 to the distal end 122. In this exemplary fishing lure, bottom curved surface 178 is not a mirror image of upper curved surface 180.

Figure 14:
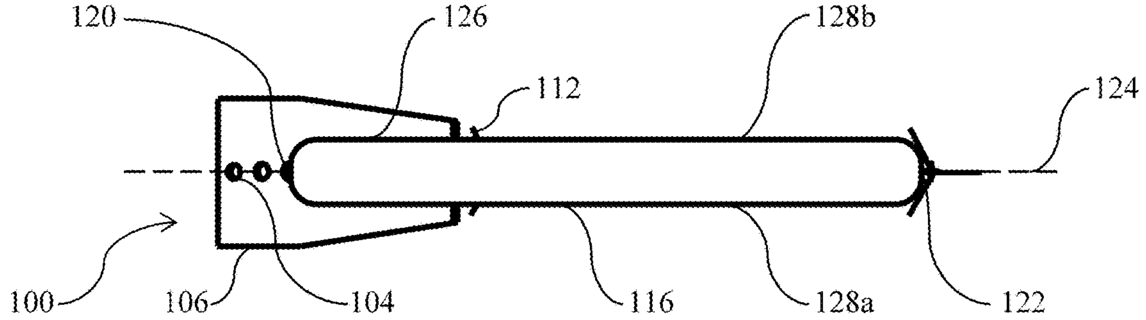
FIG. 14 illustrates a top view of the another exemplary fishing lure embodying subject matter disclosed herein.

Referring to FIG. 14, illustrating a top view of the another exemplary fishing lure, the lure body 116 has a proximal end 120 and a distal end 122 extending longitudinally along a central axis 124, a proximal end region 126, and two substantially mirror image side surfaces 128*a* and 128*b* that are substantially planar and extending longitudinally along the central axis 124. The lure lip 106 has a least one hole 104 through it.

Figure 15:
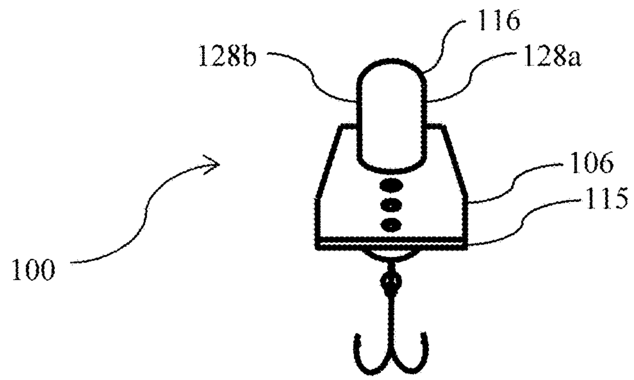
FIG. 15 illustrates a front view of the another exemplary fishing lure embodying subject matter disclosed herein.

Referring to FIG. 15, side surface 128*a* is on the port side of lure body 116 and side surface 128*b* is on the starboard side of lure body 116. Lure lip 106 has a proximal end surface 115.

Figure 16:
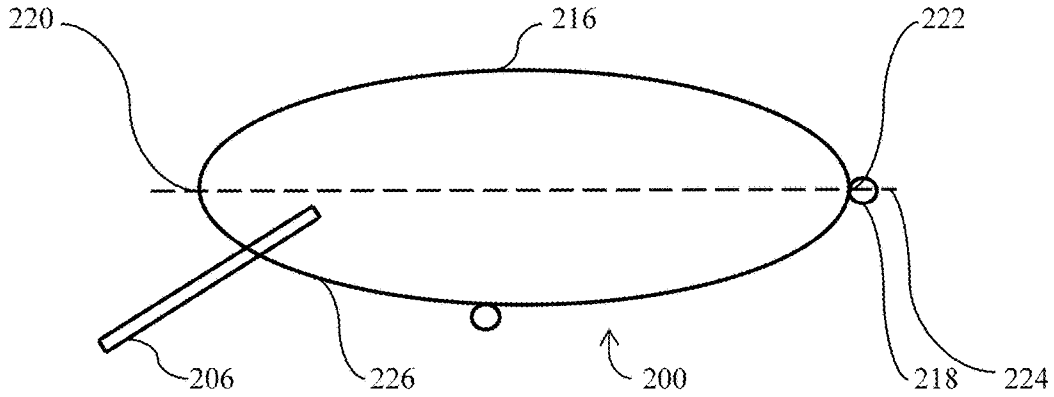
FIG. 16 illustrates a side view of yet another exemplary fishing lure embodying subject matter disclosed herein, before one or more split rings and one or more hooks are attached thereto.

Referring to FIG. 16, yet another exemplary fishing lure 200 (to which one or more split rings and one or more hooks have not yet been attached) has a lure body 216 with a circular cross-section. The lure body 216 has a proximal end 220 and a distal end 222 extending longitudinally along a central axis 224, and a proximal end region 226. A lure lip 206 is provided in the proximal end region 226 of the lure body 216. An example of suitable material from which to make the circular cross-section lure body 216 is a model 1500 series round 1½ inch handrail available at www.stairpartsusa.com in any of several wood types. One or more screw eyes 218 may be screwed into the lure body 216 for attaching split rings (not shown) to which hooks (not shown) are attached.

Figure 17:
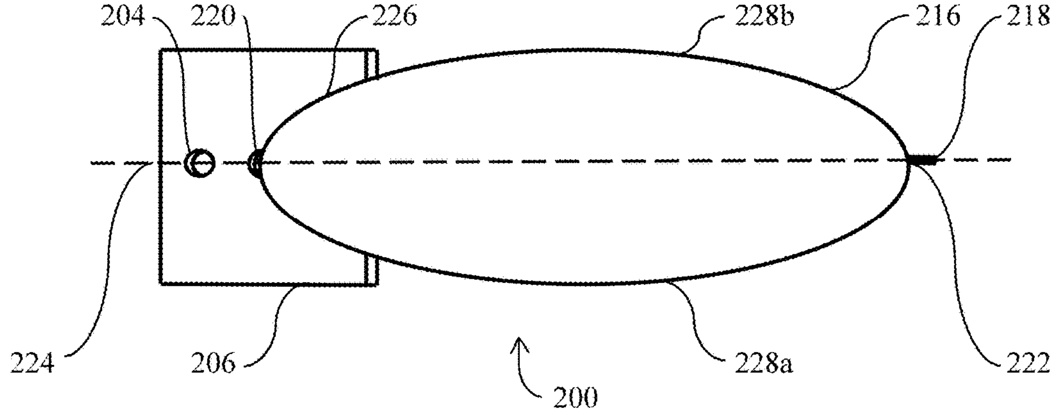
FIG. 17 illustrates a top view of the yet another exemplary fishing lure embodying subject matter disclosed herein, before one or more split rings and one or more hooks are attached thereto.

Referring to FIG. 17, the lure body 216 has a proximal end 220 and a distal end 222 extending longitudinally along a central axis 224, a proximal end region 226, and two substantially mirror image side surfaces 228*a* and 228*b* that are substantially convex. A lure lip 206 extends from proximal end region 226 and has at least one hole 204 through it. At least one hole through the lure lip 206 is selected from a group of a cylindrical hole larger than a standard ANSI clearance hole for the corresponding clevis pin diameter, a tapered slot, or a double-tapered slot.

Figure 18:
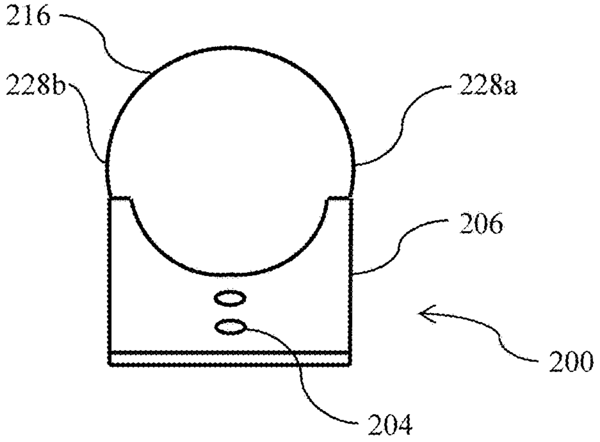
FIG. 18 illustrates a front view of the yet another exemplary fishing lure embodying subject matter disclosed herein, before one or more split rings and one or more hooks are attached thereto.

Referring to FIG. 18, the lure body 216 has a circular cross-section and substantially mirror image side surfaces 228*a* and 228*b*.

Figure 19:
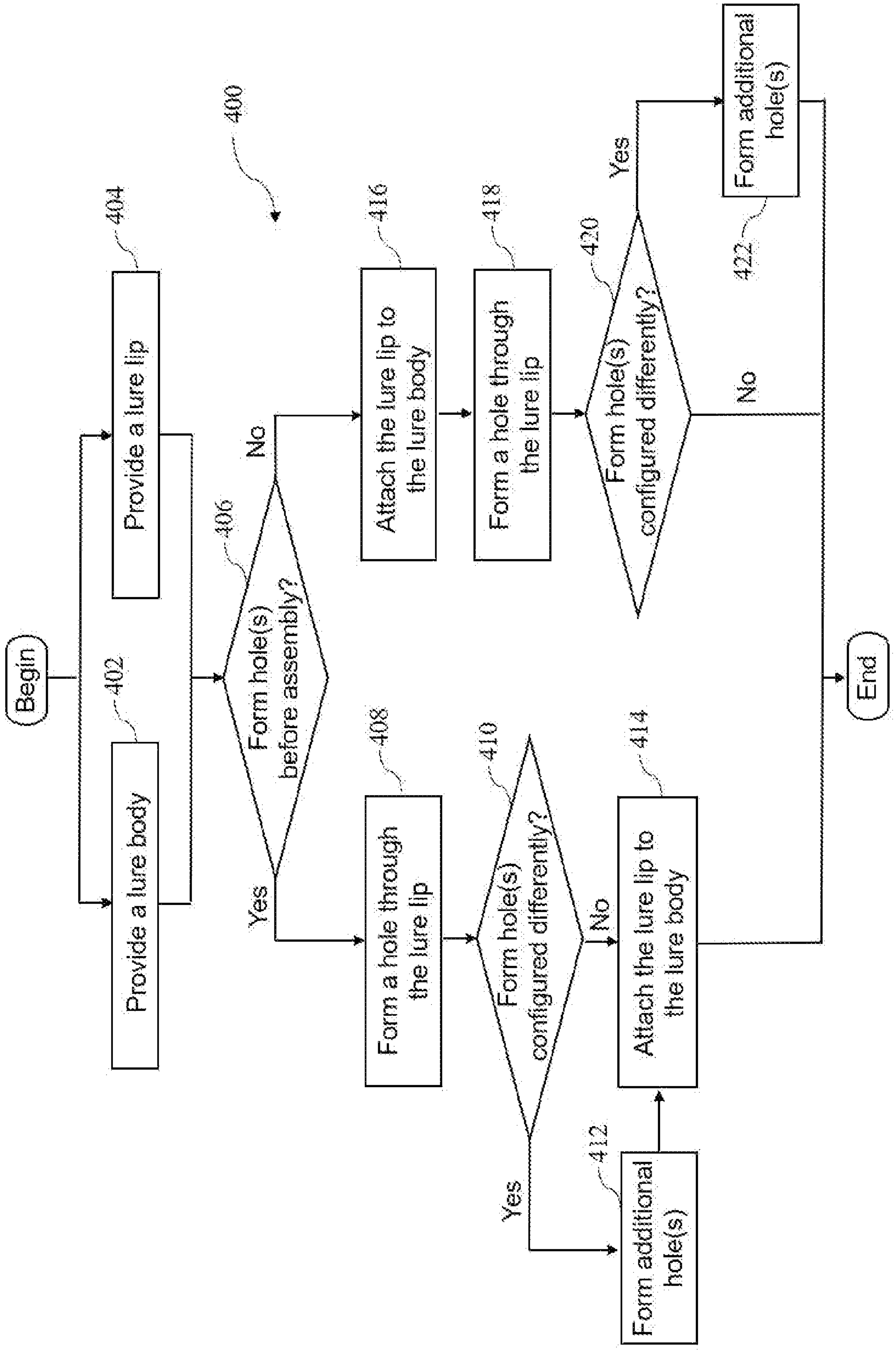
FIG. 19 illustrates a method of making a fishing lure embodying subject matter disclosed herein.

Referring to FIG. 19, a process 400 of making holes in a lure lip and attaching the lure lip to a lure body can begin with providing a lure body, as indicated at step 402, and providing a lure lip, as indicated at step 404. At step 406, a lure maker decides whether to form hole(s) in the lure lip before or after assembly of the lure lip to the lure body. If the lure maker decides to form the hole(s) before assembly, then at step 408 the lure maker proceeds with forming a hole through the lure lip. The hole may be a cylindrical hole, a tapered slot, or a double-tapered slot. At step 410, the lure maker decides whether to form one or more additional holes, at least one configured differently from the hole formed at step 408. The differently configurated hole(s) may be cylindrical hole(s) with differing diameters, one or more tapered slots, and/or one or more double-tapered slots.

If the lure maker decides not to form any additional holes, then the lure maker proceeds to step 414, attaching the lure lip to the lure body, completing the process. Alternatively, if the lure maker decides at step 410 to form any additional holes through the lure lip, then at step 412 the lure maker forms the additional hole(s) through the lure lip. After forming the holes at step 412, the lure maker attaches the lure lip to the lure body at step 414, completing the process.

If instead at step 406, the lure maker decides not to form the hole(s) before assembly, then at step 416, the lure maker attaches the lure lip to the lure body. Then at step 418, the lure maker proceeds with forming a hole through the lure lip. The hole may be a cylindrical hole, a tapered slot, or a double-tapered slot. At step 420, the lure maker decides whether to form one or more additional holes, configured differently from the hole formed at step 418. The differently configurated hole(s) may be cylindrical hole(s) with differing diameters, one or more tapered slots, and/or one or more double-tapered slots.

If the lure maker decides not to form any additional holes at step 420, then the process has been completed. Alternatively, if the lure maker decides at step 420 to form any additional holes through the lure lip, then at step 422 the lure maker forms the additional hole(s) through the lure lip. After forming the holes at 422, the process has been completed.

It is to be understood that the lure maker may provide the lure lip and form one or more holes through it before providing the lure body without departing from the spirit and scope of the method of making a fishing lure described herein. It is also to be understood that a lure maker may form one hole in the lure lip before attaching it to the lure body and forming at least another hole through the lure lip after attaching it to the lure body, without departing from the spirit and scope of the method of making a fishing lure described herein. It is also to be understood that the lure maker may have lure lips with holes pre-formed in them pre-fabricated for the lure maker and/or the lure bodies may be pre-fabricated for the lure maker without departing from the spirit and scope of the method of making a fishing lure described herein.

Figure 20:
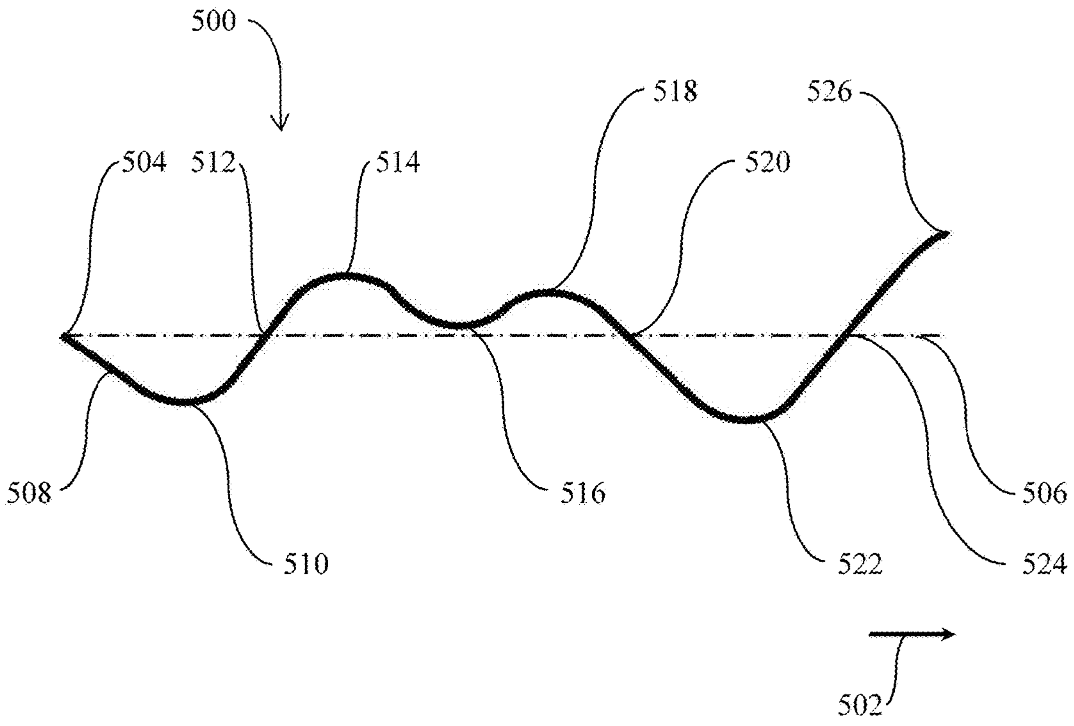
FIG. 20 illustrates an overhead view of an exemplary path of a wandering fishing lure in operation as it is trolled behind a boat.

Referring to FIG. 20, fishing lures embodying subject matter disclosed herein often wander erratically in operation, as illustrated by one such erratic path 500. For example, an angler wanting to a troll a fishing lure embodying subject matter disclosed herein behind a boat (not shown) may place the fishing lure attached to a fishing line in the water at 504 while the boat is moving in direction of travel 502 to establish a boat course centerline 506. The angler releases from the angler's fishing reel a desired amount of fishing line and attaches the fishing rod to the boat with the tip eye of the fishing rod aligned, for example, with the centerline of the boat. In FIG. 20, the distance the fishing lure is behind the boat is greater than the length of the turbulent region caused by the boat's motion through the water. After the angler stops releasing fishing line from the angler's reel, the fishing lure begins to wander to one side of the boat course centerline 506, as illustrated by fishing lure course position 508. At fishing lure course position 510, the fishing lure begins wandering back toward boat course centerline 506 and crosses boat course centerline 506 at fishing lure course position 512 on its way to fishing lure course position 514. At fishing lure course position 514, the fishing lure begins wandering back toward boat course centerline 506, but does not cross boat course centerline 506 and at lure course position 516 again begins to wander out to that same side of the boat course centerline 506 until it reaches fishing lure course position 518, where it again starts to wander back toward boat course centerline 506. At fishing lure course position 520, the fishing lure crosses boat course centerline 506 and continues on to the other side of boat course centerline 506 until it reaches fishing lure course position 522 (a wandering amplitude crest), at which the fishing lure again begins wandering back toward and past the boat course centerline 506, this time at fishing lure course position 524 and continues on until it reaches lure course position 526. At fishing lure course position 526, the fishing lure again reaches a wandering amplitude crest.

Erratic wandering paths such as this and other random variations thereof can continue in various paths until the lure is brought back into the boat, ending the trolling session.

Figure 21:
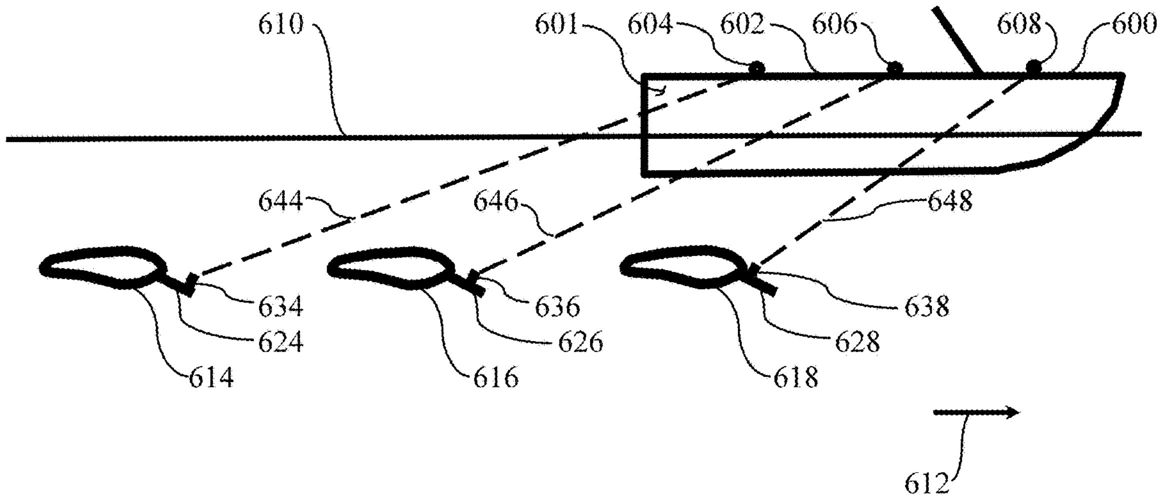
FIG. 21 illustrates a method of fishing using a plurality of fishing lures embodying 5 subject matter disclosed herein.

Referring to FIG. 21, a boat 600 comprising a starboard side 601 and a starboard gunwale 602. Starboard gunnel 602 may, for example, have fishing rods 604, 606, and 608 mounted directly, or indirectly, to starboard gunwale 602 and projecting outward from the starboard side 601 while boat 600 is traveling partially submerged along a water surface 610 in direction of travel 612.

An angler may select, for example, three substantially identically configured fishing lures 614, 616, and 618 configured to achieve substantially the same amplitude of wandering action at the same operating depth with different amounts of fishing line out. Although operation of three fishing lures is illustrated, in other embodiments fewer or more than three fishing lures may be connected to the gunnel of the boat.

The three fishing lures illustrated in the FIG. 21 may, for example, be configured with a most proximal hole being cylindrical, a most distal hole being a double-tapered slot, and a third hole located in between the most proximal hole and the most distal hole configured as a tapered slot. In another embodiment, all the holes may be configured as cylindrical holes, tapered slots, or double-tapered slots with the most proximal hole having the smallest diameter or major axis and the most distal hole having the greatest diameter or major axis. In other embodiments, other hole configuration combinations may be used and the most proximal hole has the smallest diameter or major axis and the most distal hole has the greatest diameter or major axis.

The angler may insert substantially rigid connector 634 through the most proximal hole of lure lip 624 and then attach it, directly or indirectly, to fishing line 644 which is attached to fishing rod 604 at its other end. The angler may then release (let out) a desired amount of fishing line 644 until fishing lure 614, the trailing lure, reaches a desired distance behind starboard side 601 of boat 600.

The angler may insert substantially rigid connector 636 through the hole in between the most proximal hole of lure lip 626 and the most distal hole of lure lip 626 and then attach it, directly or indirectly, to fishing line 646 which is attached to fishing rod 606 at its other end. The angler may then release a desired amount of line 646 until fishing lure 616 approaches close enough to fishing line 644 to cause concern in the angler that fishing lure 616 may become fouled on fishing line 644. The angler may then pause releasing fishing line 646 until fishing lure 616 reaches its target running depth, and then release additional fishing line 646 until fishing lure 616, the intermediate fishing lure in the array, reaches a desired distance ahead of fishing lure 614. Because the substantially rigid connector 636 has been inserted in lure lip 626 of fishing lure 616 at a steeper dive setting than substantially rigid connect 634 had been inserted in lure lip 624 of fishing lure 614, fishing line 646 is not parallel to fishing line 644. Rather, the fishing lines diverge from each other the farther they get from the gunnel. Thus, the distance between fishing lure 614 and fishing lure 616 is greater than the distance between fishing rod 604 and fishing rod 606.

Fishing lure 616 will present more yawing (tail wiggle) action than fishing lure 614, because rigid connector 636 is positioned more distal in lure lip 626 than rigid connector 634 is positioned in lure lip 624.

The angler may insert substantially rigid connector 638 through the most distal hole of lure lip 628 and then attach it, directly or indirectly, to fishing line 648 which is attached to fishing rod 608 at its other end. The angler may then release a desired amount of fishing line 648 until fishing lure 618 approaches close enough to fishing line 646 to cause concern in the angler that fishing lure 618 may become fouled on fishing line 646. The angler may then pause releasing fishing line until fishing lure 618 reaches its target running depth and then release additional fishing line 648 until fishing lure 618, the leading fishing lure in the array, reaches a desired distance ahead of fishing lure 616. Because the substantially rigid connector 638 has been inserted in lure lip 628 of fishing lure 618 at a steeper dive setting than substantially rigid connect 636 had been inserted in lure lip 626 of fishing lure 616, fishing line 648 is not parallel to fishing line 646. Rather, the fishing lines diverge from each other the farther they get from the gunnel. Thus, the distance between fishing lure 616 and fishing lure 618 is greater than the distance between fishing rod 606 and fishing rod 608.

Fishing lure 618 will present more yawing (tail wiggle) action than fishing lure 616, because rigid connector 638 is positioned more distal in lure lip 628 than rigid connector 636 is positioned in lure lip 626.

Each fishing lure is the array may optionally have been painted with a different pattern. For example, fishing lure 614 may be painted to imitate the appearance of a white sucker, fishing lure 616 may be painted to imitate the appearance of a walleye, and fishing lure 618 may be painted to imitate the appears of a yellow perch. The color pattern of each fishing lure can be selected to match the relative natural amount of tail wiggle action a given species of prey fish would exhibit versus a different species of prey fish.

If the boat is driven in a straight path, three different tail wiggle actions are presented to the target gamefish in a succession. If the boat is driven in a sinuous path, such as when the driver is following a sinuous lake bottom contour line, the paths of the fishing lures will differ. An angler may further troll three additional fishing lures configured substantially identical to each other off the port side of the boat in a similar manner, covering a greater span of water and using additional lure color patterns if desired. The port side fishing lures may be configured to have more or less wander than the starboard side fishing lures.

Three substantially identically configured fishing lures were discussed by way of example above. Fewer or more fishing lures may be used per side of a boat. For example, substantially identically configured fishing lures may be provided with four differently configured holes through their lure lips, each hole configured differently to operate as the leading, second in line, third in line, and trailing fishing lure in the array. Alternatively, each of the fishing lures could be provided with a single hole configured specifically to operate as the leading, second in line, third in line, or trailing fishing lure in the array.

Fishing lures for practicing the above disclosed method of fishing may be sold individually or in kits, and may include instructions on how to operate a plurality of the fishing lures from a side of a boat generally in accordance with the method described above.

Figure 22:
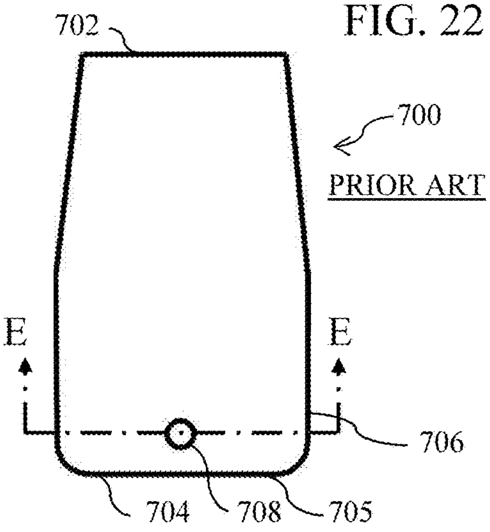
FIG. 22 illustrates a top view of a traditional lure lip featuring a cylindrical hole through it.

Referring to FIG. 22, lure lip 700 has a distal end 702 for inserting into a proximal end region of a lure body during assembly of a traditional wandering fishing lure, a proximal end 704, a proximal end surface 705, a proximal end region 706, and at least one ANSI standard clearance hole 708 through it along its centerline in the proximal end region 706.

Figure 23:
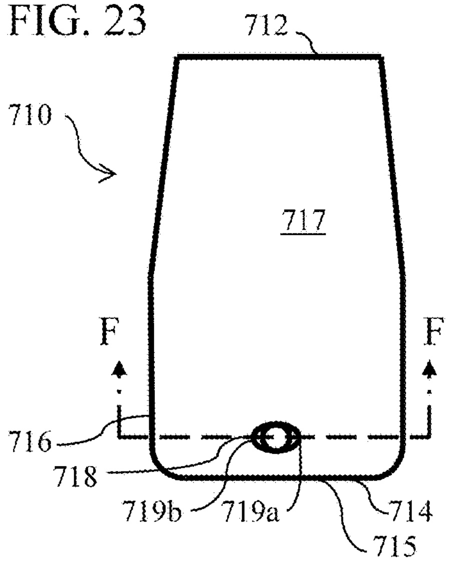
FIG. 23 illustrates a top view of a lure lip embodying subject matter disclosed herein, featuring a tapered slot through it, the tapered slot having a major axis at the top surface of the lure lip.

Referring to FIG. 23, lure lip 710 embodying subject matter disclosed herein has a distal end 712 for inserting into a proximal end region of a lure body during assembly of a wandering fishing lure embodying subject matter hereof, a proximal end 714, a proximal end surface 715, a proximal end region 716, a top surface 717, an opposing bottom surface, and a tapered slot 718 through lure lip 710 along its centerline in the proximal end region 716. Tapered slot 718 has tapered slot end surface **719*a* and an opposing tapered slot end surface 719*b*. In this illustration, the tapered slot 718 is illustrated as located in proximal end region 716**, but it may be located more distal in other embodiments.

Figure 24A:
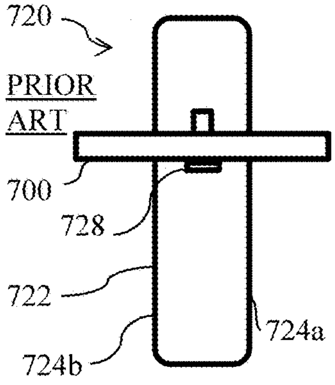
FIG. 24A illustrates a traditional wandering fishing lure in operation, as viewed looking at the proximal end surface of the lure lip projecting toward the viewer from the proximal end region of the lure body, when the traditional wandering fishing lure is in a steady state position behind the tip eye of a fishing rod.

Referring to FIG. 24A, a traditional fishing lure 720 comprises a lure body 722 extending along a central axis and having substantially planar side surfaces **724*a* and 724*b*, a lure lip 700 according to FIG. 22 partially inserted into lure body 722 in a proximal end region, a clevis pin 728 inserted through lure lip 700 before operation of the fishing lure 720, one or more screw eyes (not shown), and one or more hooks (not shown). Side surface 724*a* is on the port side of the lure body 722 and side surface 724*b* is on the starboard side of the lure body. During steady state operation of the traditional fishing lure 720 behind the tip eye of a fishing rod, the traditional fishing lure 720 rolls side-to-side substantially symmetrically with the average orientation of its two substantially planar side surfaces 724*a* and 724*b*** being vertical.

Figure 24B:
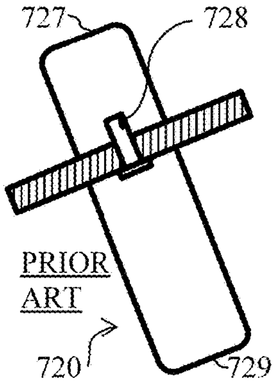
FIG. 24B illustrates an example of the traditional fishing lure of FIG. 24A in operation as the traditional wandering fishing lure is wandering to a side, with a cross sectional view of the lure lip along line E-E in FIG. 22 illustrating the substantially rigid connector orientation within the lure lip.

Referring to FIG. 24B, as the traditional fishing lure 720 wanders to port side of the centerline of its path in this example, it reaches an orientation transition zone in which it continues to roll, but the average orientation of its side surfaces **724*a* and 724*b* is no longer vertical. Top surface 727 of lure body 722 is generally closer overall to the centerline of the fishing lure's path centerline than bottom surface 729 of lure body 722** is.

Figure 24C:
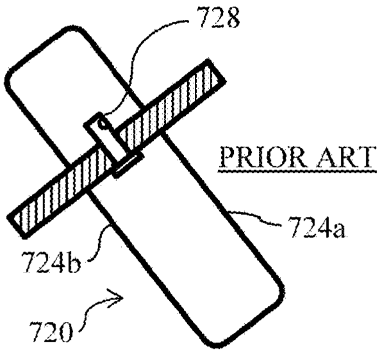
FIG. 24C illustrates an example of the traditional wandering fishing lure of FIG. 24A in operation as the traditional fish lure reaches a maximum extent of its wandering in a cycle along its path, with a cross sectional view of the lure lip along line E-E in FIG. 22 illustrating the substantially rigid connector orientation within the lure lip.

Referring to FIG. 24C, as the traditional fishing lure 720 reaches the wandering amplitude crest (see, for example, fishing lure course position 526 in FIG. 20) in its path toward port side in this example, the average orientation of its side surfaces 724*a* and 724*b* is tipped away from vertical even more. The traditional fishing lure 720 begins to wander back toward starboard.

Figure 25A:
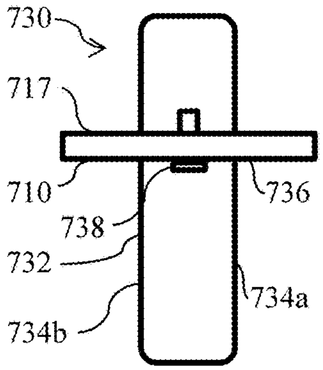
FIG. 25A illustrates a wandering fishing lure embodying subject matter disclosed herein comprising a lure lip having a tapered slot though it and a clevis pin inserted though the tapered slot in operation, as viewed looking at the proximal end surface of the lure lip projecting toward the viewer from the proximal end region of the lure body, when the fishing lure is in a steady state position behind the tip eye of a fishing rod.

Referring to FIG. 25A, an embodiment of a fishing lure 730 embodying subject matter disclosed herein comprises a lure body 732 extending along a central axis and having substantially planar side surfaces 734*a* on its port side and 734*b* on its starboard side and a lure lip 710 according to FIG. 23 partially inserted into lure body 732 in a proximal end region and having a bottom surface 736. A clevis pin 738 is inserted through lure lip 710 before operation of the fishing lure 730. The fishing lure has one or more screw eyes (not shown) and one or more hooks (not shown). During steady state operation of the fishing lure 730 behind the tip eye of a fishing rod mounted on a boat in motion, the fishing lure rolls side-to-side substantially symmetrically with the average orientation of its substantially planar side surfaces 734*a* and 734*b* being vertical. Side surface 734*a* is on the port side of the fishing lure and side surface 734*b* is on the starboard side of the fishing lure.

Figure 25B:
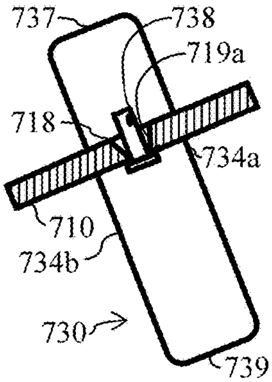
FIG. 25B illustrates an example of the wandering fishing lure of FIG. 25A in operation as the fishing lure is wandering to the port side of the centerline of its path, with a cross sectional view of the lure lip along line F-F in FIG. 23 illustrating the substantially rigid connector orientation within the tapered slot through the lure lip.

Referring to FIG. 25B, lure lip 710 features a tapered slot 718. As the fishing lure 730 wanders to the port side of the centerline of its path, it reaches an orientation transition zone in which it continues to roll, but the average orientation of its side surfaces 734*a* and 734*b* is no longer vertical. Top surface 737 of lure body 732 is generally closer overall to the centerline of the fishing lure's path centerline than bottom surface 739 of lure body 732 is.

Figure 25C:
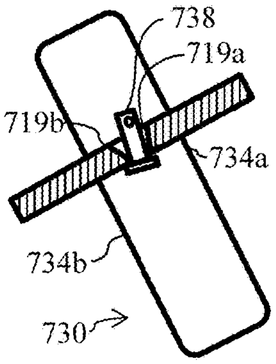
FIG. 25C illustrates an example of the wandering fishing lure of FIG. 25A in operation as the fishing lure is wandering further to the port side of the centerline of its path, with a cross sectional view of the lure lip along line F-F in FIG. 23 illustrating the substantially rigid connector orientation within the tapered slot through the lure lip.

Referring to FIG. 25C, as fishing lure 730 wanders even further to a side, it reaches an orientation transition zone in which it continues to roll, but the average orientation of its side surfaces are even less vertical than in its position illustrated in FIG. 25B. Unlike a traditional wandering fishing lure, clevis pin 738 is situated in a tapered slot and tilts to enable fishing lure 730 to wander yet even further out to a side.

Figure 25D:
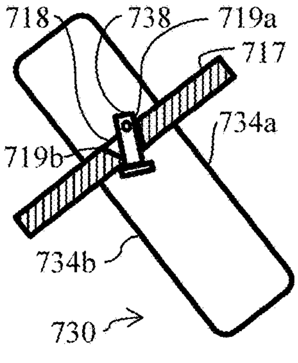
FIG. 25D illustrates an example of the wandering fishing lure shown in FIG. 25A in operation as the fishing lure reaches a maximum extent of its wandering to the port side of the centerline of its path, with a cross sectional view of the lure lip along line F-F in FIG. 23 illustrating the substantially rigid connector orientation within the lure lip.

Referring to FIG. 25D, as fishing lure 730 reaches the wandering path crest (see, for example, fishing lure course position 526 in FIG. 20) in its path in this example, the average orientation of its side surfaces is tipped away from vertical even more and clevis pin 738 is temporarily resting against tapered slot end surface 719*a* on the port side of the tapered slot or the corner formed by tapered slot end surface 719*a* and the top surface of the lure lip. For the sake of clarity, when the fishing lure reaches the crest of its wandering amplitude on the port side of the centerline of the rod tip's course centerline, the clevis pin is temporarily resting against the port side tapered slot end surface. After reaching this wandering path crest, the fishing lure begins to wander back towards the centerline of the boat's course. When the fishing lure reaches the crest of its wandering amplitude on the starboard side of the centerline of the rod tip's course centerline, the clevis pin is temporarily resting against the starboard side surface of the tapered slot end surface or the corner formed by the tapered slot end surface and the top surface of the lure lip.

Figure 26:
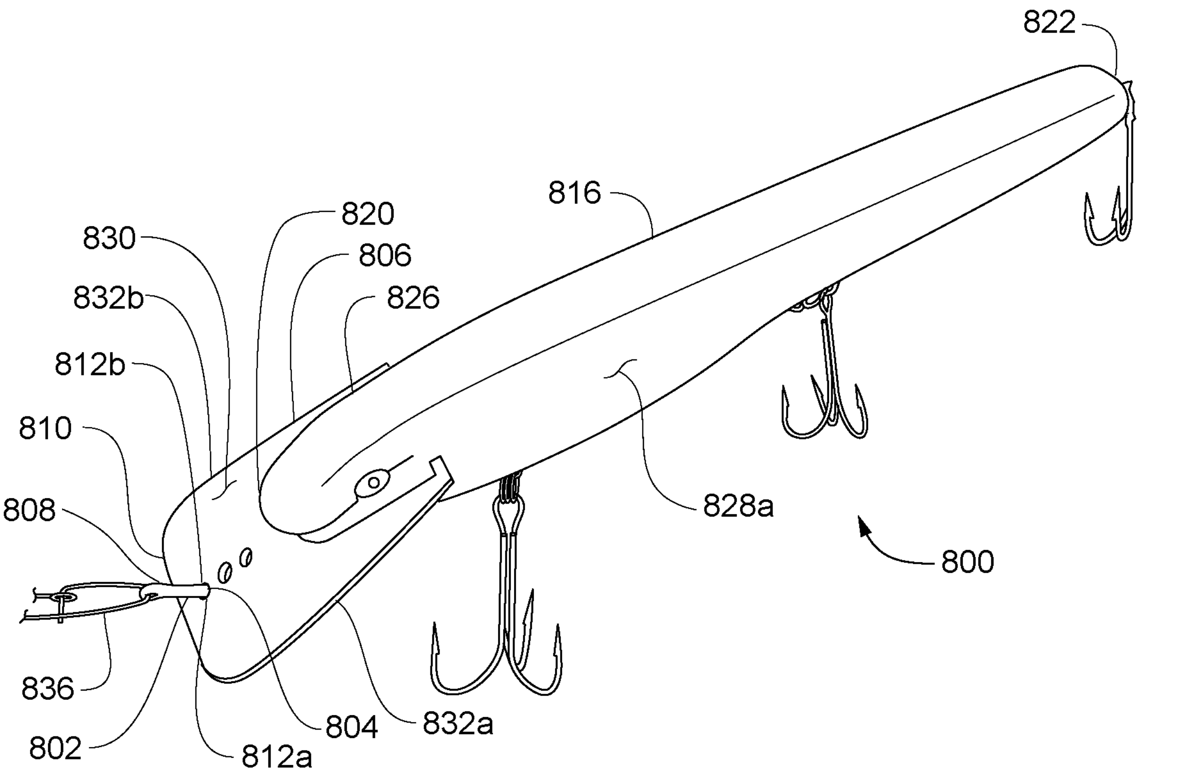
FIG. 26 is an illustration, as viewed from a side in the horizontal plane and perpendicular to the course of the tip eye of a fishing rod attached to a moving boat, of the orientation of a fishing lure embodying subject matter disclosed herein in operation in the water when it reaches the maximum extent of its wandering amplitude on the starboard side of the centerline of its path.

Referring to FIG. 26, the orientation of a fishing lure 800 embodying subject matter disclosed herein in operation in the water when it reaches a wandering path crest on the starboard side of the centerline of its path (see, for example, fishing lure course position 522 in FIG. 20) is tilted in all three planes. The orientation of the fishing lure 800 may be yawed, pitched, and rolled at the same time. The fishing lure 800 has a lure body 816 having a proximal end 820, a distal end 822, a proximal end region 826, and two substantially mirror image planar side surfaces 828*a* and 828*b* (828*b* not shown) equally spaced apart on either side of the central axis of fishing lure 800. A lure lip 806 descends at angle from proximal end region 826.

Lure lip 806 has a top surface 830, a bottom surface (not shown) opposing the top surface 830, a proximal end surface 810, and two side surfaces 832*a* and 832*b*. Lure lip 806 has tapered slot 804 through it. Tapered slot 804 has a major axis perpendicular to the centerline of the lure lip 806 at top surface 830 and is substantially round at the bottom surface, resulting in tapered slot end surface 812*a* and tapered slot end surface 812*b*. Before operation of the fishing lure 800, a clevis pin 802 is inserted through tapered slot 804, a split ring 808 is connected to the clevis pin 802, and a snap 836 connected to a fishing line (not shown) is connected to split ring 808. The tow force transmitted through the fishing line, snap 836, and split ring 808, transmits to clevis pin 802 at an upward angle relative to the top surface 830 of the lure lip 806, because, in part, the tip eye of the fishing rod in this example is above water and the fishing lure is below water.

When fishing lure 800 reaches an amplitude crest (see, for example, fishing lure course position 522 in FIG. 20) of a wandering path in this example, its central axis between proximal end 820 and distal end 822 is not parallel to the course of the tip eye of the fishing rod (mounted on a moving boat) towing fishing lure 800. Rather it is at angle, with the proximal end 820 being closer to the centerline of the tip eye's course than distal end 822 is. Also, distal end 822 is higher in elevation than proximal end 820 is when fishing lure 800 reaches the amplitude crest of a wandering path. The central axis of the fishing lure 800 is at an angle in the vertical plane. Also, fishing lure 800 is tilted side to side, and so is top surface 830 of lure lip 806. Side surface 832*b* of lure lip 806 is higher in elevation overall than side surface 832*a* of lure lip 806 is overall. In response to the tow force transmitted through the fishing line, snap 830, and split ring 808, clevis pin 802 rests against tapered slot side surface 812*b*. For the sake of clarity, clevis pin 802 is resting against tapered slot side surface 812*b* on the opposite side of the central axis of fishing lure 800 as planar side surface 828*a* is on. In this tilted position of clevis pin 802, a wandering fishing lure embodying subject matter disclosed herein having a non-ANSI standard clearance hole through its lure lip is enabled to wander further out to a side than an otherwise identically configured traditional wandering fishing lure would be enabled to wander.

Figure 27:
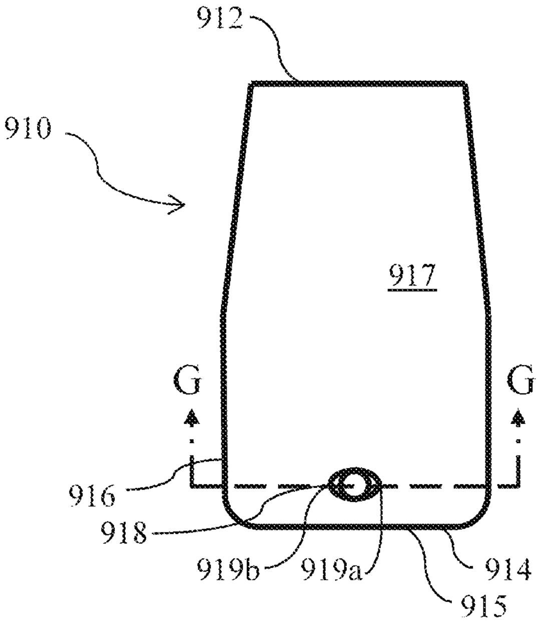
FIG. 27 illustrates a top view of a lure lip embodying subject matter disclosed herein, featuring a double-tapered slot through it.

Referring to FIG. 27, lure lip 910 embodying subject matter disclosed herein has a distal end 912 for inserting into a proximal end region of a lure body during assembly of a wandering fishing lure embodying subject matter hereof, a proximal end 914, a proximal end surface 915, a proximal end region 916, a top surface 917, an opposing bottom surface (not shown), and a double-tapered slot 918 through lure lip 910 along its centerline in the proximal end region 916. Double-tapered slot 918 has tapered slot end surface 919*a* and an opposing tapered slot end surface 919*b*. Surfaces 919*a* and 919*b* are formed between the top surface of the lure lip and the midsection of the double-tapered slot. In this illustration, the double-tapered slot 918 is illustrated as located in proximal end region 916, but it may be located more distal in other embodiments.

Figure 28:
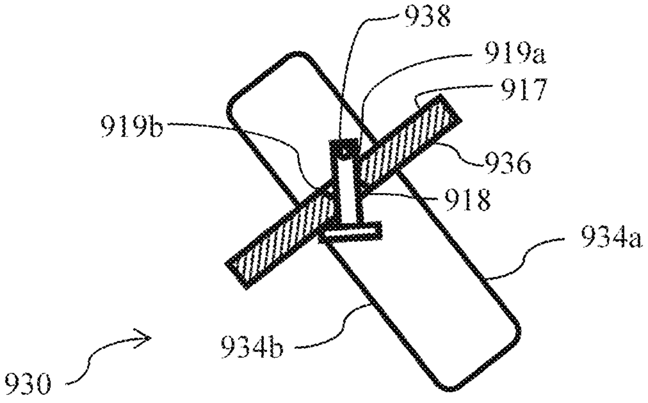
FIG. 28 illustrates an example of a wandering fishing lure embodying subject matter disclosed herein in operation as the fishing lure reaches a maximum extent of its wandering in a cycle along its path, with a cross sectional view of the lure lip along line G-G in FIG. 27 illustrating the substantially rigid connector orientation within the lure lip.

Referring to FIG. 28, as fishing lure 930 reaches the wandering path crest (see, for example, fishing lure course position 526 in FIG. 20) in its path in this example, the average orientation of its side surfaces 934*a* on the port side of the fishing lure and 934*b* on the starboard side of the fishing lure is tipped away from vertical and clevis pin 938 is temporarily resting against double-tapered slot end surface 919*a* on the port side of the tapered slot or the corner formed by double-tapered slot end surface 919*a* and the top surface of the lure lip 910. Clevis pin 938 is blocked from pulling through the double-tapered slot 918 by bottom surface 936 of lure lip 910.

Figure 29:
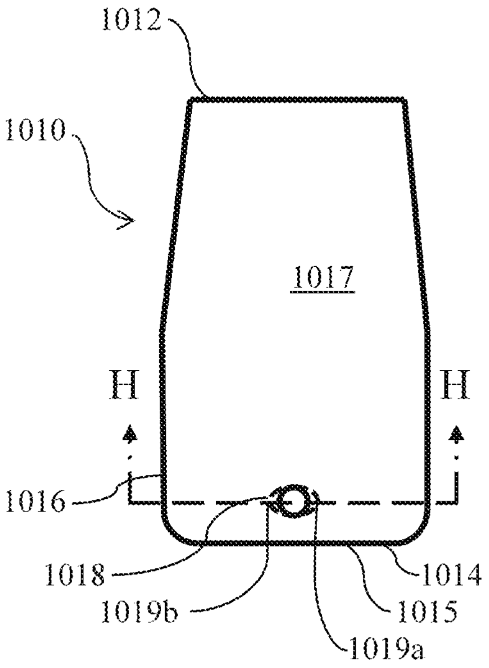
FIG. 29 illustrates a top view of a lure lip embodying subject matter disclosed herein, featuring a tapered slot through it, the tapered slot having a major axis at the bottom side of the lure lip.

Referring to FIG. 29, lure lip 1010 embodying subject matter disclosed herein has a distal end 1012 for inserting into a proximal end region of a lure body during assembly of a wandering fishing lure embodying subject matter hereof, a proximal end 1014, a proximal end surface 1015, a proximal end region 1016, a top surface 1017, an opposing bottom surface (not shown), and a tapered slot 1018 through lure lip 1010 along its centerline in the proximal end region 1016. Tapered slot 1018 has tapered slot end surface 1019*a* and an opposing tapered slot end surface 1019*b*. In this illustration, the tapered slot 1018 is illustrated as located in proximal end region 1016, but it may be located more distal in other embodiments.

Figure 30:
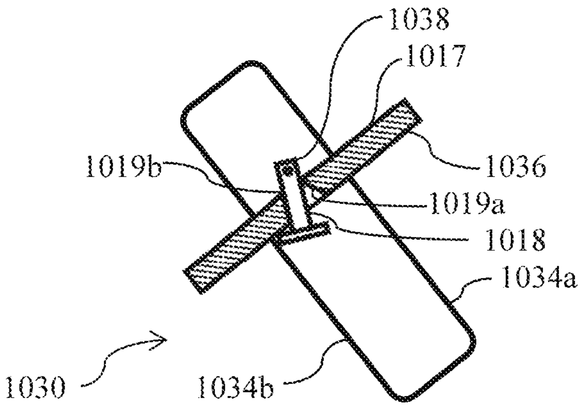
FIG. 30 illustrates an example of a wandering fishing lure embodying subject matter disclosed herein in operation as the fishing lure reaches a maximum extent of its wandering in a cycle along its path, with a cross sectional view of the lure lip along line H-H in FIG. 29 illustrating the substantially rigid connector orientation within the lure lip.

Referring to FIG. 30, as fishing lure 1030 reaches the wandering path crest (see, for example, fishing lure course position 526 in FIG. 20) in its path in this example, the average orientation of its side surfaces 1034*a* on the port side of fishing lure 1030 and 1034*b* on the starboard side of fishing lure 1030 is tipped away from vertical and substantially rigid connector 1038 is temporarily resting against tapered slot end surface 1019*b* on the starboard side of the tapered slot or the corner formed by slot end surface 1019*a* on the port side of the tapered slot and the top surface 1017 of the lure lip 1010. Clevis pin 1038 is blocked from pulling through the double-tapered slot 1018 by bottom surface 1036 of lure lip 1010.

The embodiments above are intended to be illustrative and not limiting. Additional embodiments are within the claims. Although subject matter hereof has been described with reference to particular embodiments, workers skilled in the art will recognize that changes may be made in form and detail without departing from the spirit and scope of the subject matter.

Various modifications to subject matter hereof may be apparent to one of skill in the art upon reading this disclosure. For example, persons of ordinary skill in the relevant art will recognize that the various features described for the different embodiments disclosed herein can be suitably combined, un-combined, and re-combined with other features, alone, or in different combinations, within the spirit of the subject matter. Likewise, the various features described above should all be regarded as example embodiments, rather than limitations to the scope or spirit of the subject matter. Therefore, the above is not contemplated to limit the scope of the subject matter.

What is claimed is:

1. A fishing lure, comprising:

a lure body having a proximal end and a distal end extending longitudinally along a central axis, a proximal end region and two side surfaces;

a lure lip provided in the proximal end region of the lure body having a top surface and a bottom surface, the lure lip protruding outwardly from the lure body at an angle to the central axis, a plurality of holes provided through the lure lip being spaced along the lure lip such that there is at least a more proximal hole and a more distal hole;

wherein the holes in the lure lip are sized to receive a substantially rigid connector inserted through a selected one of them and at least one of the holes configured to enable the substantially rigid connector to tilt side to side along a plane substantially perpendicular to a centerline of the lure lip in operation of the fishing lure; and wherein at least one hole through the lure lip is manufactured to be configured differently from an other hole through the lure lip.

2. The fishing lure of claim 1, wherein at least one of the holes through the lure lip is manufactured as a tapered slot, the tapered slot having a major axis at either the top surface or the bottom surface of the lure lip, the major axis being substantially perpendicular to the centerline of the lure lip, the tapered slot having a minor axis perpendicular to the major axis, and the tapered slot is substantially round on the surface of the lure lip that is opposite the surface at which the tapered slot has the major axis;

the tapered slot being configured to receive a substantially rigid connector and to enable the substantially rigid connector to tilt more in the tapered slot than the substantially rigid connector would be enabled to tilt in a cylindrical hole having the same diameter as the minor axis of the tapered slot.

3. The fishing lure of claim 1, wherein the fishing lure has a port side and at least one hole through the lure lip is configured as a tapered slot terminating at the top surface and at the bottom surface of the lure lip, the slot configured to enable the substantially rigid connector to temporarily rest against an end surface of the slot or a corner formed by the end surface and at least one of the top surface or the bottom surface of the lure lip when the fishing lure reaches the crest of its wandering amplitude on the port side of the centerline of a rod tip's course centerline.

4. The fishing lure of claim 1, wherein the more proximal hole has a major axis along the top surface or the bottom surface of the lure lip substantially perpendicular to the centerline of the lure lip, a minor axis along that same surface of the lure lip and parallel to the centerline of the lure lip, the major axis of the more proximal hole equal to or greater than its minor axis, the more distal hole has a major axis along the top surface or the bottom surface of the lure lip, the more distal hole has a minor axis along that same surface of the lure lip and parallel to the centerline of the lure lip, and the major axis of the more distal hole is greater than its minor axis.

5. The fishing lure of claim 4, wherein the more distal hole is configured such that the fishing lure has substantially the same or greater amplitude of wandering action with the fishing lure moving at a given speed with a given amount of fishing line out in operation compared to the fishing lure's wandering action amplitude when the substantially rigid connector is positioned in the more proximal hole.

6. The fishing lure of claim 1, wherein at least one hole is manufactured as a double-tapered slot;

the double-tapered slot having a first major axis at the top surface of the lure lip, a second major axis in a midsection of the double-tapered slot, and a third major axis at the bottom surface of the lure lip;

the first major axis, the second major axis, and the third major axis of the double-tapered slot substantially perpendicular to the centerline of the lure lip;

the double-tapered slot having a minor axis parallel to the centerline of the lure lip;

the double-tapered slot being configured to receive a substantially rigid connector; and the double-tapered slot configured to enable the substantially rigid connector to tilt more in the double-tapered slot than it would be enabled to tilt in a cylindrical hole having the same diameter as the minor axis of the double-tapered slot.

7. The fishing lure of claim 6, wherein the first major axis and the third major axis of the double-tapered slot more distal than a more proximal hole are configured such that the fishing lure has substantially the same or greater amplitude of wandering action with the fishing lure moving at a given speed with a given amount of fishing line out in operation compared to the fishing lure's wandering action amplitude when the substantially rigid connector is positioned in the more proximal hole.

8. A fishing lure, comprising:

a lure body having a proximal end and a distal end extending longitudinally along a central axis, a proximal end region, and two side surfaces;

a lure lip provided in the proximal end region of the lure body having a top surface and a bottom surface, the lure lip protruding outwardly from the lure body at an angle to the central axis, the lure lip having a centerline, at least one hole provided through the lure lip sized to receive a substantially rigid connector and configured to enable the substantially rigid connector to tilt side to side substantially perpendicular to the centerline of the lure lip in operation of the fishing lure; and wherein at least one hole through the lure lip is manufactured as a tapered slot, the slot having a major axis at a surface of the lure lip substantially perpendicular to the centerline of the lure lip.

9. The fishing lure of claim 8, wherein the at least one hole through the lure lip has a minor axis substantially parallel to the centerline of the lure lip and the at least one hole is configured to enable the fishing lure to roll side to side about its central axis more in operation than it would be enabled to if the at least one hole were cylindrical and having the same diameter as the minor axis of slot.

10. A lure lip for a fishing lure, the lure lip having a top surface, a bottom surface, two opposing side surfaces, a centerline between the opposing side surfaces, and at least one hole through it, the at least one hole sized to receive a substantially rigid connector having a shaft inserted through the hole, the at least one hole manufactured with a major axis at the top surface or the bottom surface of the lure lip, the major axis substantially perpendicular to the centerline between the side surfaces, a minor axis along the same surface as the major axis, the minor axis substantially parallel to the centerline of the lure lip, and the major axis substantially greater than the minor axis wherein the lure lip has a plurality of manufactured holes through it, each hole configured to individually receive a substantially rigid connector, and the holes configured to enable the substantially rigid connector to have a different degree of maximum tilt relative to a top surface of the lure lip when the substantially rigid connector is positioned in a select one of the holes.

11. The lure lip of claim 10, wherein the at least one hole is a tapered slot.

12. The lure lip of claim 10, wherein the at least one hole is a double-tapered slot.

13. The lure lip of claim 10, wherein the double-tapered slot has a major axis at the top surface and another major axis at the bottom surface and the major axes of the double-tapered slot are the same length at both the top surface and the bottom surface of the lure lip.

* * * * *